(12) United States Patent
Matsumoto

(10) Patent No.: US 7,046,599 B2
(45) Date of Patent: May 16, 2006

(54) OPTICAL DISC RECORDING METHOD AND OPTICAL DISC RECORDING APPARATUS FOR SETTING OPTIMAL RECORDING POWER TO RECORD DATA

(75) Inventor: Keishi Matsumoto, Costa Mesa, CA (US)

(73) Assignee: Yamaha Corporation, Hamamatsu (JP)

( * ) Notice: Subject to any disclaimer, the term of this patent is extended or adjusted under 35 U.S.C. 154(b) by 293 days.

(21) Appl. No.: 10/392,265

(22) Filed: Mar. 19, 2003

(65) Prior Publication Data
US 2004/0017751 A1    Jan. 29, 2004

(30) Foreign Application Priority Data
Mar. 22, 2002    (JP)    ............................... 2002-080962

(51) Int. Cl.
*G11B 7/00*    (2006.01)
(52) U.S. Cl. .................... 369/47.5; 369/47.53; 369/116
(58) Field of Classification Search ................ 369/116, 369/47.51, 47.53, 47.55, 47.5
See application file for complete search history.

(56) References Cited

U.S. PATENT DOCUMENTS

| | | | |
|---|---|---|---|
| 6,418,102 B1 * | 7/2002 | Suga | 369/47.53 |
| 6,563,775 B1 * | 5/2003 | Sato | 369/47.53 |
| 6,628,595 B1 * | 9/2003 | Sasa et al. | 369/59.12 |
| 6,771,577 B1 * | 8/2004 | Yokoi | 369/59.11 |
| 6,842,412 B1 * | 1/2005 | Ushiyama et al. | 369/47.53 |

FOREIGN PATENT DOCUMENTS

| | | |
|---|---|---|
| CN | 1335593 A | 2/2002 |
| JP | 2001-344751 | 12/2001 |

* cited by examiner

*Primary Examiner*—Nabil Hindi
(74) *Attorney, Agent, or Firm*—Pillsbury Winthrop Shaw Pittman LLP

(57) ABSTRACT

An optical disc recording method comprises the steps of: setting a recording parameter function representing a relationship between a recording velocity for recording data to an optical disc and a parameter for optimally controlling a recording power controlling waveform for controlling a recording power of a light beam irradiated to the optical disc for recording the data; obtaining an optimal value for the parameter by executing a test recording at one recording velocity or at a plurality of recording velocities to a test area of the optical disc before actual data recording to the optical disc; correcting the recording parameter function in accordance with the obtained optimal value for the parameter; deriving the parameter corresponding to a recording velocity from the corrected recording parameter function; and recording the data by irradiating a light beam of the recording power controlling waveform to which the obtained parameter is applied.

8 Claims, 10 Drawing Sheets

OPTICAL DISC RECORDING METHOD AND OPTICAL DISC RECORDING APPARATUS FOR SETTING OPTIMAL RECORDING POWER TO RECORD DATA

CROSS REFERENCE TO RELATED APPLICATION

This application is based on Japanese Patent Application 2002-080962, filed on Mar. 22, 2002, the entire contents of which are incorporated herein by reference.

BACKGROUND OF THE INVENTION

A) Field of the Invention

This invention relates to a technique for recording data by setting an optimum recording power even if a difference in recording velocities of a write-once optical disc and a re-writable optical disc is large.

B) Description of the Related Art

In recent years, a velocity for recording data in a constant linear velocity (CLV) recording optical disc (hereinafter called just an optical disc) like a write-once optical disc like a rewritable optical disc such as a CD-R, a DVD-R and the like and such as a CD-RW, a DVD-RW, a DVD-RAM and the like is on the track of high-speeding. The optical disc is regulated to record data by fixed recording density. Therefore, conventionally, the optical disc has recorded data by a constant linear velocity method (CLV) to record data with fixed transmission velocity. However, as technological advance, a recording method with high recording velocity such as a partial constant angular velocity (partial CAV) method, a zone constant linear velocity (zone CLV) method and a zone constant angular velocity (zone CAV) method has been used.

FIGS. 8A to 8D show relation charts between a radius position and a linear velocity in each recording method. In the partial CAV method, as shown in FIG. 8A, a recording velocity is accelerated by keeping a fixed rotation velocity of the disk (constant angular velocity: CAV) at an inner track side of the disk to be recorded. Then after attaining to the maximum recording velocity, recording is executed with a fixed linear velocity without interruption/resume of recording. In the zone CLV method, as shown in FIG. 8B, an opening from inner part of the disk to be recorded to an outer track is divided to zones (hereinafter called divide), and recording is executed with fixed velocity in the zones. Then interruption/resume of recording is executed for further writing by applying a buffer under run protection technology in a velocity switching position between zones. Moreover, the buffer under run protection technology is a technique to prevent occurrence of a buffer under run error certainly by pausing writing and waiting recovery of a buffer level in a case that writing data amount of buffering is below a fixed level, and by accurately starting further writing from a point paused recording after recovery. In the zone CAV method, as shown in FIG. 8C, an opening from inner part of the disk to be recorded to an outer track is divided to some zones, and recording is executed with fixed angular velocity in the zones. Then interruption/resume of recording is executed to write further by applying a buffer under run protection technology in a velocity switching position between zones.

Also, as high performance of a spindle motor to rotatively drive the optical disc and technological advance of data recording to the optical disc, as shown in FIG. 8D, a full CAV method (hereinafter called CAV method) to record data in a whole area of the optical disc with the CAV method becomes to be used for high velocity recording.

FIG. 9 is a cross sectional view showing an area structure of the CD-R and the CD-RW (hereinafter also called CD-R/RW) that are examples of the optical discs. As shown in FIG. 9, the CD-R/RW has a diameter of 120 mm and a thickness of 1.2 mm. Also, in the CD-R/RW, a section with a diameter from 46 to 50 mm as a lead in area and a section with a diameter from 50 to 118 mm as a program area and a remaining area are provided. The program area can record data up to a section with a maximum diameter of 116 mm.

There is 2.5 times difference between a length of the most inner track in the program area of the CD-R/RW and a length of the most outer track in the program area. Also, the CD-R/RW is an optical disc to record data by fixed recording density as described before. Therefore, when the optical disc is recorded with the CAV method, there will be 2.5 times difference in data transmission velocity between the most inner track and the most outer track in the program area. Therefore, as recording velocity is high, an amount of change in the velocity is large. For example, in the case that recording velocity at the most inner track in the program area is set to be 4 times speed (×4), recording velocity at the most outer track in the program area will be 10 times speed (×10). On the other hand, in the case that recording velocity at the most inner track in the program area is set to be 16 times speed (×16), recording velocity at the most outer track in the program area will be 40 times speed (×40).

When recording in the optical disc is executed by the CAV method, an optimum recording power to irradiate the optical disc needs to be changed sequentially because the linear velocity changes depending on recording areas. Therefore, in the conventional optical disc recording apparatus, the recording velocity from the inner track side to the outer track side is continuously fastened, and the recording power of the optical disc to which the optical disc is irradiated is increased continuously to record data. For example, when recording is executed by the CAV method, the optimum recording power is changed to record according to a linear function Y=aX+b (Y: recording power, X: recording velocity) as a recording power function.

Also, in the conventional optical disc recording apparatus, this recording power function is defined by a following method. FIGS. 10A to 10C are character charts of the recording power function. When fitting the recording power function, an optimum character at each recording velocity by each type of the optical discs is obtained by experimentation, a slope of the recording power function a is fitted by using the average value and a approximate value by a least-squares method. In a first method, the recording power function is determined in accordance with data obtained by performing an OPC at, for example, the minimum recording velocity as shown in FIG. 10A while the optical disc of a type is identified when the data is to be recorded. Also, in a second method, the recording power function is determined by an interpolating/extrapolating linear approximation in accordance with data obtained by performing OPCs at 2 recording velocities as shown in FIG. 10B while the optical disc of a type is identified when the data is to be recorded. Further, in a third method, the recording power function is determined by an interpolating/extrapolating linear approximation in accordance with data obtained by performing OPCs at a minimum recording velocity and a maximum recording velocity as shown in FIG. 10C.

However, in a case that the first method to define the recording power function is used, an area where the power function characteristic is approximately the same as the originally suitable value is only in and around initial power obtained by the OPCs as shown in FIG. 10A, and other part is a approximate value. Therefore, an optimum value may not be obtained. Also, in a case that recording is executed by the CAV method, as described before, as a rotation velocity of the optical disc is high, as this tendency grows because the difference of the recording velocity (amount of velocity change) between the inner track side and the outer track side is getting large.

Also, in a case that the second method to define the recording power function is used, when the difference of the recording velocity between two to execute the OPC is considerably small, the power function characteristic being approximately the same as the originally suitable value is only in and around initial power obtained by the OPC as same as the first method, and other part is an approximate value. Therefore, an optimum value might not be obtained. Also, as described before, as a rotation velocity of the optical disc is high, amount of velocity change between the inner track side and the outer track side is getting large. Therefore, in a case of an optical disc that has a test recording area only in an inner track side, the difference of the recording velocity between two to execute the OPC cannot be enlarged.

For example, in a case that a recording velocity (a linear velocity amplification) is a normal speed, a rotation velocity at the most outer track in the program area is approximately 200 rpm, and the rotation velocity needs to be approximately 500 rpm in order to make a linear velocity at the most inner track in the program area be same as that at the most outer track. In this case, the optical disc can be rotated enough even inner track side. On the other hand, in a case that the recording velocity (the linear velocity amplification) is 48 times speed, a rotation velocity at the most outer track in the program area is approximately 9600 rpm, and the rotation velocity needs to be approximately 24000 rpm in order to make a linear velocity at the most inner track in the program area be same as that at the most outer track. However, when the optical disc is rotated with a velocity of 24000 rpm, there is every possibility of a self-destruction of the optical disc by a self-excited vibration, and it is extremely dangerous. Also, the optical disc apparatus normally does not equip a spindle motor with such a high-speed rotation. Therefore, the OPC can be executed only at two velocities of an executable recording velocity in the test recording area in inner track side.

Therefore, as same as the problem of the above-described first method, the power function characteristic being approximately the same as the originally suitable value is at a velocity obtained the power by the OPC or in the velocity of it. As the recording velocity is away from the velocity to execute the OPC, an optimum recording power will be far different from the value obtained by the power function obtained by extrapolating linear approximation. Therefore, recording with a high quality is difficult.

Moreover, in a case that the third method to define the recording power function, in the optical disc that has a inner test recording area and a outer test recording area, the OPC is executed with a minimum recording velocity in the inner test recording area, and the OPC is executed with a maximum recording velocity in the outer test recording area as shown in FIG. 10C. Then the recording power function can be obtained by an interpolating linear approximation. However, since the recording power function is obtained by linear interpolation, as a difference of the recording velocity between inner and outer track sides is large, an optimum recording power in an intermediate area at a recording velocity will be different from an interpolated power. Therefore, recording with a high quality is difficult.

In addition to the above, in the first to third methods, the recording power function is different depending on a change of an environmental temperature around the optical disc and a wave length of a laser light beam irradiated to the optical disc.

SUMMARY OF THE INVENTION

It is an object of the present invention to provide an optical disc recording method and an optical disc recording apparatus that can record data by setting an optimum recording power even in the case that a difference of the recording velocity between inner and outer track sides of a write-once optical disc and a re-writable optical disc is large.

According to one aspect of the present invention, there is provided an optical disc recording method, comprising the steps of: (a) setting a recording parameter function representing a relationship between a recording velocity for recording data to an optical disc and a parameter for optimally controlling a recording power controlling waveform for controlling a recording power of a light beam irradiated to the optical disc for recording the data; (b) obtaining an optimal value for the parameter by executing a test recording at one recording velocity or at a plurality of recording velocities to a test area of the optical disc before actual data recording to the optical disc; (c) correcting the recording parameter function in accordance with the obtained optimal value for the parameter; (d) deriving the parameter corresponding to a recording velocity from the corrected recording parameter function; and (e) recording the data by irradiating a light beam of the recording power controlling waveform to which the obtained parameter is applied.

In this structure, a test recording is executed in a test area of the optical disc at one or plurality of the recording velocities, and the recording parameter function is corrected by an optimum value of the parameter obtained by a test recording and the recording velocity. Then, a data recording is executed by irradiating a light beam with recording power controlling waveform that is applied a parameter derived from the corrected recording parameter function. Therefore, even in the case that the difference of the recording velocity is large, data with an optimum reproducing signal quality corresponding to whatever recording velocity can be obtained.

Moreover, parameters in the recording power controlling waveform of the light beam are each timing of writes strategy, a magnitude of each power, frequency and the like.

According to another aspect of the present invention, there is provided an optical disc recording method wherein data is recorded to a recording area of an optical disc by continuously increasing, from an inner track side to an outer track side of the optical disc, a recording velocity for recording data and, simultaneously, continuously strengthening a recording power of a light beam irradiated to the optical disc for recording the data, the method comprising the steps of: (a) allocating a plurality of zones to the recording area of the optical disc and assigning a recording power function to each zone representing, with a linear function, a relation ship of the recording velocity and an optimal value of the recording power of the light beam; (b) obtaining an optimal recording power by executing a test recording to a test area of the optical disc at one recording velocity before actual recording of data to the optical disc; (c) correcting the recording power function in accordance with the obtained optimal recording power; (d) deriving a recording power corresponding to a recording velocity from the corrected recording power function; and (e) recording the data by irradiating a light beam of the obtained recording power.

In this structure, each recording power function assigned to plurality of zones which are allocated in the recording area in the optical disc is corrected with an optimum recording power obtained by executing the test recording in the test area in the optical disc at one recording velocity and the recording velocity. Then, a light beam powered as an optimum recording power derived from each corrected recording power function is irradiated to execute data recording. Therefore, an optimum recording powered light beam corresponding to the recording velocity can be irradiated to record data, and data with an optimum reproducing signal quality can be obtained even if the difference of the recording velocity becomes large. Also, since plurality of zones is allocated in the recording area, the difference of the recording velocity between a minimum recording velocity and a maximum recording velocity in each zone becomes small. If the recording power function is set to be a linear function, margin of errors will hardly causes, and an optimum recording power can be obtained. Moreover, since a simple linear function control is executed in each zone, an apparatus structure will cost less than the conventional apparatus.

According to further another aspect of the present invention, there is provided an optical disc recording method wherein data is recorded to a recording area of an optical disc by continuously increasing, from an inner track side to an outer track side of the optical disc, a recording velocity for recording data and, simultaneously, continuously strengthening a recording power of a light beam irradiated to the optical disc for recording the data, the method comprising the steps of: (a) allocating a plurality of zones to the recording area of the optical disc and assigning a recording power function to each zone representing, with a linear function, a relation ship of the recording velocity and an optimal value of the recording power of the light beam and setting a coefficient representing a relationship of slopes of the recording power functions; (b) obtaining an optimal recording power by executing a test recording to a test area of the optical disc at two recording velocities corresponding to those of a predetermined zone before actual recording of data to the optical disc; (c) correcting the slope of the recording power function of the predetermined zone in accordance with the obtained optimal recording power and correcting the slopes of other zones in accordance with the corrected recording power function of the predetermined zone and the coefficient; (d) deriving a recording power corresponding to a recording velocity from the corrected recording power function; and (e) recording the data by irradiating a light beam of the obtained recording power.

In this structure, an optimum recording power is obtained by executing test recordings in a test area of an optical disc with two velocities which execute in a predetermined zone in plurality of zones allocated in a recording area of the optical disc, and a slope of the recording power function of the zone is corrected, and a slope of the recording power function in each zone is corrected based on a preset coefficient. Then a light beam powered as an optimum recording power derived from the corrected recording power function is irradiated to execute data recording. Therefore, an effect that is same as (2) can be obtained, and data recording can be executed with an optimum recording power corresponding to a peripheral temperature and change in wavelength of the light beam because a slope of the recording power function in each zone is corrected.

According to yet another aspect of the present invention, there is provided an optical disc recording method wherein data is recorded to a recording area of an optical disc by continuously increasing, from an inner track side to an outer track side of the optical disc, a recording velocity for recording data and, simultaneously, continuously strengthening a recording power of a light beam irradiated to the optical disc for recording the data, the method comprising the steps of: (a) allocating a plurality of zones to the recording area of the optical disc and assigning a recording power function to each zone representing, with a linear function, a relation ship of the recording velocity and an optimal value of the recording power of the light beam, setting a full recording power function representing, with a linear function, a relationship between two recording velocities that are a minimum and a maximum recording velocities in all over the recording area and an optimal recording power of the light beam and setting a coefficient representing relationship between a slope of the full recording power function and a slope of the recording power function of each zone; (b) obtaining an optimal recording power by executing a test recording to a test area of the optical disc at the two recording velocities that are the minimum and the maximum recording velocities before actual recording of data to the optical disc; (c) correcting the slope of the full recording power function in accordance with the obtained optimal recording power and correcting the slopes of the recording power function of each zone in accordance with the corrected full recording power function and the coefficient; (d) deriving a recording power corresponding to a recording velocity from the corrected recording power function; and (e) recording the data by irradiating a light beam of the obtained recording power.

In this structure, an optimum recording power is obtained by executing test recordings in a test area of an optical disc at two velocities of a minimum recording velocity and a maximum recording velocity in a full recording area of the optical disc in which a plurality of zones are allocated, and a slope of the full recording power function of the above full area is corrected based on the obtained optimum recording powers. Also, a slope of the recording power function of each zone is corrected based on the corrected full recording power function and a preset coefficient, and data recording is executed based on this recording power function. Therefore, an effect that is same as (1) can be obtained, and an optimum recording power can be obtained because a slope of the recording power function in each zone is corrected. A large margin of error will not be caused in an intermediate area in the recording area, as it will be by conventional method.

According to still another aspect of the present invention, there is provided an optical disc recording method wherein data is recorded to a recording area of an optical disc by continuously increasing, from an inner track side to an outer track side of the optical disc, a recording velocity for recording data and, simultaneously, continuously strengthening a recording power of a light beam irradiated to the optical disc for recording the data, the method comprising the steps of: (a) allocating a plurality of zones to the recording area of the optical disc and assigning a recording parameter function to each zone representing, with a linear function, a relation ship of the recording velocity and a parameter for recording power controlling waveform of a light beam; (b) obtaining an optimal value of the parameter by executing a test recording to a test area of the optical disc at one recording velocity before actual recording of data to the optical disc; (c) correcting the recording parameter function in accordance with the obtained optimal parameter; (d) deriving a parameter corresponding to a recording velocity from the corrected recording parameter function; and (e) recording the data by irradiating a light beam of the recording power controlling waveform to which the obtained parameter.

In this structure, each recording parameter function assigned to plurality of zones which are allocated in the recording area in the optical disc is corrected with an optimum parameter value derived from executing the test recording in the test area in the optical disc at a recording velocity and the recording velocity. Then, a recording power controlling waveform light beam to which the optimum parameter value derived from the each corrected recording parameter function is applied is irradiated to execute data recording. However, in the conventional recording method with the CAV method, as the maximum recording velocity becomes faster, the recording power margin of error becomes larger because the difference of the recording velocity (amount of velocity change) between the inner track side and the outer track side becomes large, this defect can be improved. Also, since plurality of zones are allocated in the recording area, the difference of the recording velocity between the minimum recording velocity and the maximum recording velocity in each zone gets small. If the recording parameter function is set to be a linear function, margin of errors will hardly causes, and an optimum recording parameter can be obtained. Moreover, data can be recorded with more optimum recording quality by correcting a part or whole part of a write strategy (a recording power controlling waveform) by the above method.

According to further yet another aspect of the present invention, there is provided an optical disc recording method wherein data is recorded to a recording area of an optical disc by continuously increasing, from an inner track side to an outer track side of the optical disc, a recording velocity for recording data and, simultaneously, continuously strengthening a recording power of a light beam irradiated to the optical disc for recording the data, the method comprising the steps of: (a) allocating a plurality of zones to the recording area of the optical disc and assigning a recording parameter function to each zone representing, with a linear function, a relation ship of the recording velocity and a parameter for recording power controlling waveform of a light beam and setting a coefficient representing a relationship of a slope of the recording parameter function of each zone; (b) obtaining an optimal value of the parameter by executing a test recording to a test area of the optical disc at two recording velocities corresponding to those of a predetermined zone before actual recording of data to the optical disc; (c) correcting the slope of the recording parameter function of the predetermined zone in accordance with the obtained optimal recording power and correcting the slopes of the recording parameters of other zones in accordance with the corrected recording parameter function of the predetermined zone and the coefficient; (d) deriving a parameter corresponding to a recording velocity from the corrected recording parameter function; and (e) recording the data by irradiating a light beam of the recording power controlling waveform to which the obtained parameter.

In this structure, an optimum parameter value is obtained by executing a test recording in a test area of an optical disc at two velocities which corresponds to those in a predetermined zone in plurality of zones allocated in a recording area of the optical disc, and a slope of the recording parameter function of the zone is corrected, and a slope of the recording parameter function in each zone is corrected based on a preset coefficient. Then a light beam with a recording power controlling waveform to which an optimum parameter value derived from the corrected recording parameter function is applied is irradiated to execute data recording. Therefore, an effect that is same as (3) can be obtained, and data can be recorded with more optimum recording quality by correcting a part or whole part of a write strategy (a recording power controlling waveform) by the above method.

According to still further another aspect of the present invention, there is provided an optical disc recording method wherein data is recorded to a recording area of an optical disc by continuously increasing, from an inner track side to an outer track side of the optical disc, a recording velocity for recording data and, simultaneously, continuously strengthening a recording power of a light beam irradiated to the optical disc for recording the data, the method comprising the steps of: (a) allocating a plurality of zones to the recording area of the optical disc and assigning a recording parameter function to each zone representing, with a linear function, a relation ship of the recording velocity and a parameter for recording power controlling waveform of a light beam, setting a full recording parameter function representing, with a linear function, a relationship between two recording velocities that are a minimum and a maximum recording velocities in all over the recording area and an optimal value of the parameter for recording power controlling waveform of a light beam and setting a coefficient representing relationship between a slope of the full recording parameter function and a slope of the recording parameter function of each zone; (b) obtaining an optimal value of the parameter by executing a test recording to a test area of the optical disc at the two recording velocities that are the minimum and the maximum recording velocities before actual recording of data to the optical disc; (c) correcting the slope of the full recording parameter function in accordance with the obtained optimal recording power and correcting the slopes of the recording parameter function of each zone in accordance with the corrected full recording parameter function and the coefficient; (d) deriving a parameter corresponding to a recording velocity from the corrected recording parameter function; and (e) recording the data by irradiating a light beam of the recording power controlling waveform to which the obtained parameter.

In this structure, an optimum parameter value is obtained by executing test recordings in a test area of an optical disc at two velocities of a minimum recording velocity and a maximum recording velocity in a full recording area of the optical disc in which a plurality of zones are allocated, and a slope of the full recording parameter function of the above full area is corrected based on the recording velocity and the optimum parameter value. Also, a slope of the recording parameter function of each zone is corrected based on the corrected full recording parameter function and a preset coefficient, Then a light beam with a recording power controlling waveform to which a parameter value obtained by this recording parameter function is applied is irradiated to execute data recording. Therefore, an effect that is same as (4) can be obtained, and an optimum recording power can be obtained because a slope of the recording power function in each zone is corrected. A large margin of error will not be caused in an intermediate area in the recording area as it will be by conventional method, and data can be recorded with more optimum recording quality by correcting a part or whole part of a write strategy (a recording power controlling waveform) by the above method.

According to the present invention, even if the difference of the recording velocity is large, data with an optimum reproducing quality corresponding to the recording velocity can be obtained.

Also, data can be recorded by irradiating a light beam with an optimum recording power corresponding to a recording velocity, and data with an optimum reproducing signal quality can be obtained even in a case that a difference of the recording velocity becomes larger.

Moreover, since plurality of zones are allocated in the recording area, the difference of the recording velocity between the minimum recording velocity and the maximum recording velocity in each zone gets small. Even if the recording power function is set to be a linear function, margin of errors will hardly causes, and an optimum recording power can be obtained.

In addition to that, since a simple linear function control is executed in each zone, an apparatus structure will be lower cost than the conventional apparatus. Also, data recording can be executed with an optimum recording power corresponding to a peripheral temperature and change in wavelength of the light beam.

In addition to that, a large margin of error will not be caused in an intermediate area in the recording area as conventional method, and an optimum recording power can be obtained. In addition to that, however, in the conventional recording method with the CAV method, as the maximum recording velocity becomes faster, the difference of recording power error becomes larger because the difference of the recording velocity (amount of velocity change) between the inner track side and the outer track side becomes larger, this defect can be improved.

Also data can be recorded with more optimum recording quality by correcting a part or whole part of a write strategy (a recording power controlling waveform) by the above method.

Also, data can be recorded with more optimum recording quality by correcting a part or whole part of the parameter of a write strategy by the above method.

Also, an error from the original optimum recording power is almost eliminated, and recording can be executed with a high precision. Also, since a simple linear function control is executed, it can prevent that an apparatus structure will be higher cost than the conventional apparatus.

DETAILED DESCRIPTION OF THE PREFERRED EMBODIMENTS

The present invention can be used for a case that data is recorded in a write-once optical disc that can record data only once such as CD-R, DVD-R and the like and a re-writable optical disc that can re-write data such as a CD-RW, DVD–RW, DVD+RW, DVD-RAM and the like, and the CD-R is used for the below explanation as an example.

Figure 1:
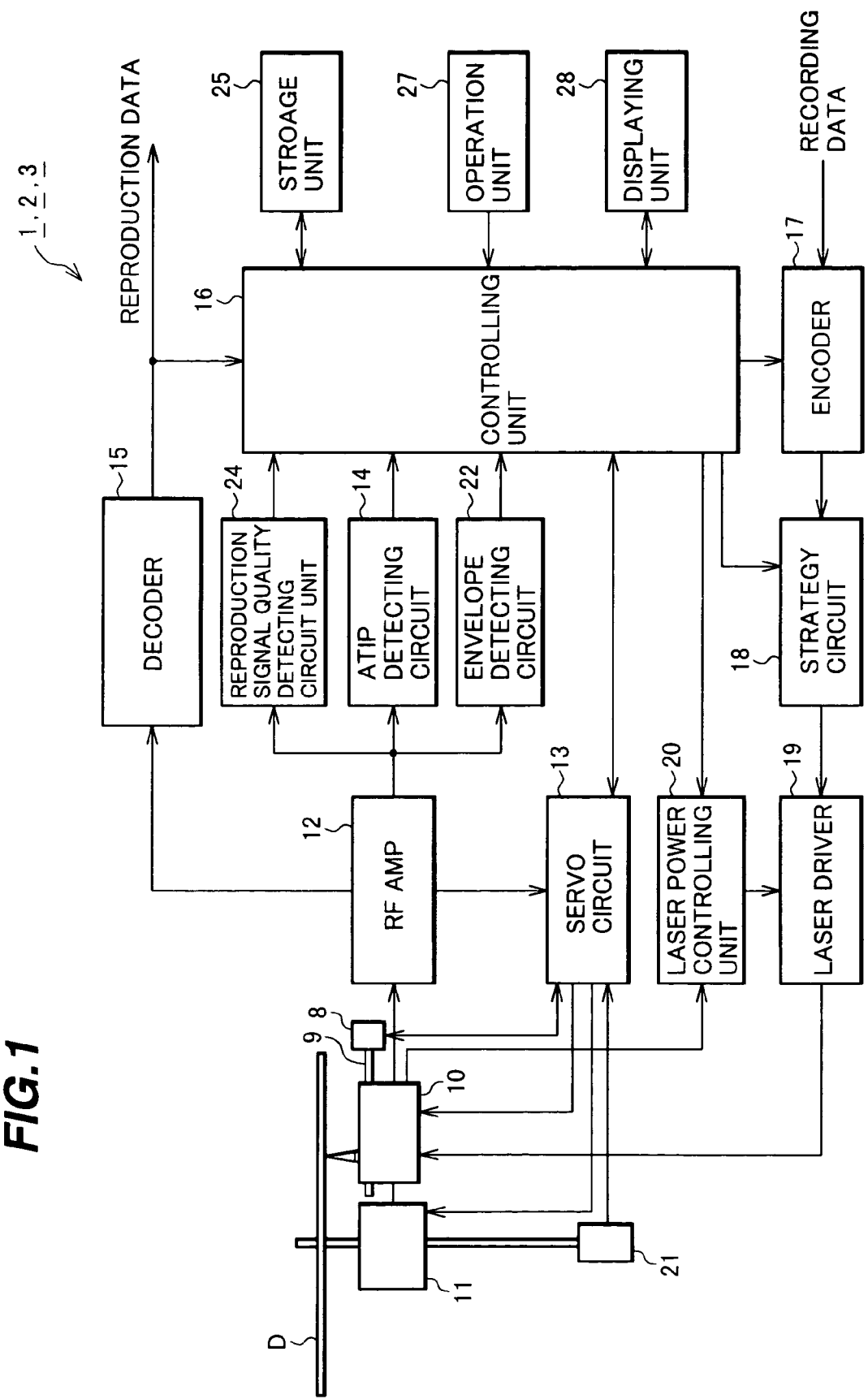
FIG. 1 is a block diagram showing a structure of an optical disc recording apparatus according to an embodiment of the present invention.

FIG. 1 is a block diagram showing a structure of an optical disc recording apparatus according to an embodiment of the present invention. As shown in FIG. 1, an optical disc recording apparatus 1 equips a feed motor 8 and a guide rail 9 which are moving units, an optical pick up 10, a spindle motor 11 that is a rotation unit, a RF amplifier 12, a servo circuit 13, an ATIP detecting circuit 14, a decoder 15, a controlling unit 16, an encoder 17, a strategy circuit 18, a laser driver 19, a laser power controlling unit 20, a frequency generating device 21, an envelope detecting circuit 22, a reproducing signal quality detecting circuit unit 24, a storage unit 25, an operation unit 27, and a displaying unit 28.

A feed motor 8 is a motor that supplies a rotation power for moving an optical pick up 10 in a direction of a radius of an optical disc.

A guide rail 9 supports an optical pick up 10 so that the optical pick up 10 moves in a direction of a radius of an optical disc.

A spindle motor 11 is a motor that rotates an optical disc D that is a target of recording data. Also, on a tip point of the axis of rotation of the spindle motor 11, an optical disc chucking mechanism (not shown) that is consisted of a turn table and the like for chucking an optical disc is provided.

The optical pick up equips an optical system such as a laser diode, a lens and a mirror, a returning light (reflected light) receiving device, a focus servo mechanism and the like. Also, a laser light is irradiate to the optical disc D at a time of recording and reproducing, and the returning light from the optical disc D is received. Then the receiving signal, an RF signal that is executed an eight to fourteen modulation (EFM), is output to an RF amplifier 12. Further, the focus servo mechanism is a servo mechanism that keeps a fixed distance between a lens of the optical pickup 10 and a data recording surface.

Also, the optical pick up 10 equips a monitor diode, and an electric current to be provided to a laser power controlling circuit 20 is generated on the monitor diode by the returning light of the optical disc D, and amount of the laser light is adjusted.

The frequency generating device 21 detects a signal of a rotation angle and a rotation velocity output by the spindle motor 11 and outputs a signal for detecting a rotation angle and a rotation velocity of the optical disc to the servo circuit 13.

The RF amplifier 12 amplifies an EFM modulated RF signal provided from the optical pick up 10 and outputs an amplified RF signal to the servo circuit 13, the ATIP detecting circuit 14, the envelope detecting circuit 22, the reproducing signal quality detecting circuit unit 24 that measures a reproducing signal quality, and the decoder 15.

The decoder 15 executes EFM demodulating of EFM modulated RF signal provided from the RF amplifier 12 to generate reproducing data and output to a storage unit 25. Also, at a time of data recording, the decoder 15 executes EFM demodulation of the RF signal provided from the RF amplifier 12 when an area recorded by a test recording is reproduced.

In an optical disc recording/reproducing apparatus 1 according to the embodiment of the present invention, a test recording is executed in a PCA area on an inner track side of the optical disc D before an actual recording. The optical disc recording apparatus 1 obtains a recording condition that can execute a satisfactory recording to the optical disc D based on the reproducing result of the area recorded this test.

Figure 2:
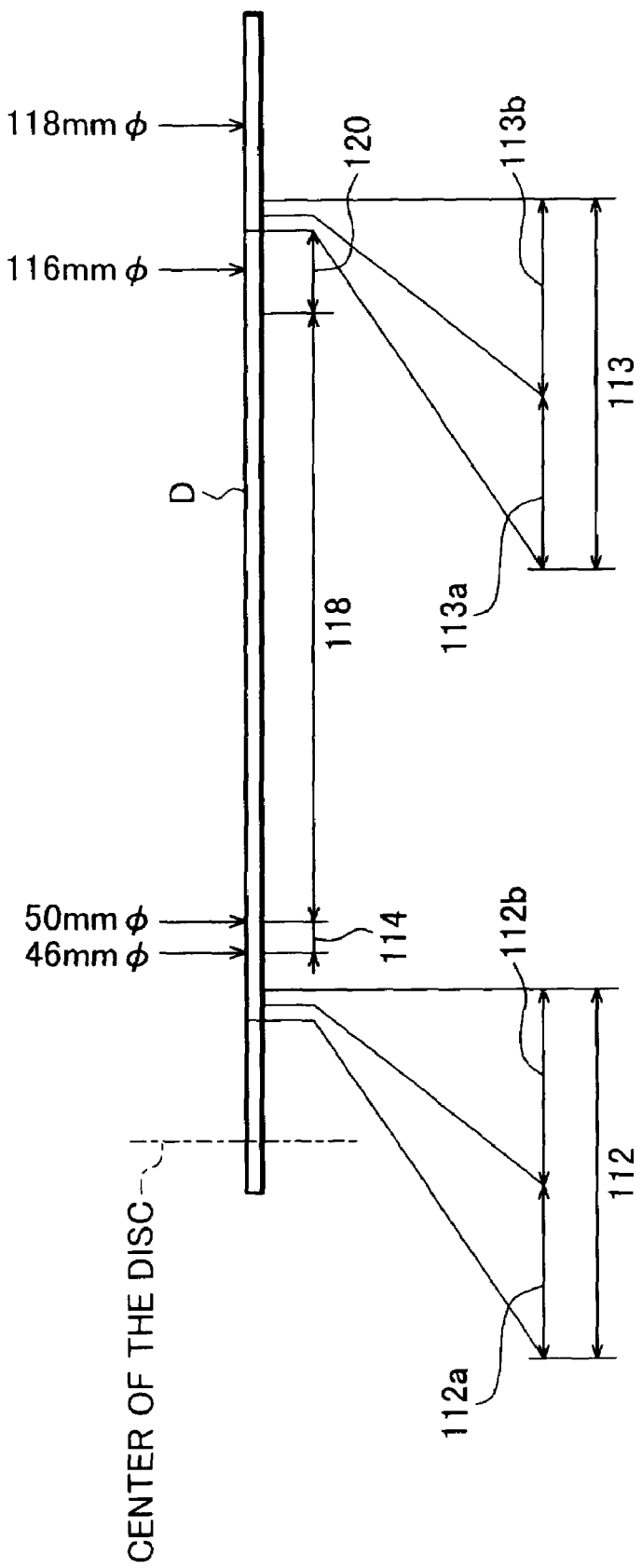
FIG. 2 is a cross sectional view showing an area structure of an optical disc.

Here, an area in which a test recording of the optical disc D is executed is explained by using FIG. 2. FIG. 2 is a cross sectional view showing an area structure of an optical disc. The optical disc D is an external diameter of 120 mm, and a section of a diameter of the optical disc D of 46 to 50 mm is provided as a lead in area 114, and a program area 118 and a remaining area 120 are provided in the outer track side for recording data. On the other hand, in the inner track side of the lead in area 114, an inner PCA area 112 is provided. Also, the inner PCA area 112 is divided into a test area 112*a* and a counting area 112*b*. At a time of data recording, a test recording is executed in this test area 112*a* before an actual recording. In the test area 112*a*, an area to which a plurality of the test recordings can be executed for obtaining parameters of an optimum writing power or an optimum writing strategy is provided. Also, in the counting area 112*b*, an EFM signal representing a portion of the test area 112*a* where the test recording has already executed is recorded at a time of an end of the test recording. Therefore, when a test recording is executed on this optical disc D next time, a position of the test area 112*a* where the next test recording should be started can be known by detecting the EFM signal in the count area 112*b*.

Moreover, at the outer track side of the remaining area 120, an outer PCA area 113 is provided. Also, the outer PCA area 113 is divided into a test area 113*a* and a counting area 113*b*. In this test area 113*a*, a test recording is executed before an actual recording as described before. In the test area 113*a*, an area to which a plurality of the test recordings can be executed is provided. Also, in the counting area 113*b*, an EFM signal representing a portion of the test area 113*a* where the test recording has already executed is recorded at a time of an end of the test recording. Therefore, when a test recording is executed on this optical disc D next time, a position of the test area 113*a* where the next test recording should be started can be known by detecting the EFM signal in the count area 113*b*.

In the optical disc recording apparatus 1 according to the embodiment of the present invention, a test recording is executed in the above test area 112*a* and the test area 113*a* before an actual recording.

Back to FIG. 1, the storage unit 25 temporarily stores reproducing data of the optical disc D output from the decoder 15 and data input from an outside of the optical disc recording apparatus 1. Then stored data is output to a data reproducing unit (not shown in the drawing) at a time of reproducing and to the encoder 17 at a time of recording data in an optical disc for recording.

The ATIP detecting circuit 14 extracts a wobble signal component from the EFM signal provided from the RF amplifier 12 and demodulates time information (address information) of each position contained in this wobble signal component, identification information (disk ID) to identify the optical disc and information that indicates disk type such as dye type of the disk to output to the controlling unit 16.

The wobble signal component is a signal component representing a wobbling frequency of a wobbled track for recording of the optical disc for recording, and time information and identification information are recorded by FM modulating of the wobbling frequency with them.

The reproducing signal quality detecting circuit unit 24 calculates β from and asymmetry of the RF signal provided from the RF amplifier as a parameter pertinent to reproducing signal quality when the test recording area of the optical disc D is reproduced and output the calculated result to the controlling unit 16. The β can be calculated by an equation, β=(a+b)/(a−b), where "a" is a peak level (a positive value) of the EFM modulated signal wave, and "b" is a bottom level (a negative value).]

The envelope detecting circuit 22 detects an envelope of the EFM signal in the count areas 112*b* and 113*b* of the above-described optical disc D in order to decide a point of the test area 112*a* from where the test recording should be started in the test area of the optical disc D before actually starting the test recording to the optical disc D.

The servo circuit 13 executes rotation control of the spindle motor 11, focus control and tracking control of the optical pick up 10, and a sending control of the feed motor 9. In the optical disc recording apparatus 1 according to the embodiment of the present invention can switch a CAV method and a CLV method when recording. The servo circuit 13 changes the CAV method and the CLV method according to the controlling signal provided from the control unit 16. In the CAV control, the servo circuit 13 controls a rotation velocity of the spindle motor 11 detected by the frequency-generating device 21 to be agreed with the predetermined rotation velocity. In the CLV control, the servo circuit 13 controls the spindle motor 11 to make a wobble signal that is supplied from the RF amplifier be a set linear velocity.

The encoder 17 executes EFM modulation to the recording data provided from the storage unit 25 and outputs to the strategy circuit 18. The strategy circuit 18 executes a time axis correction to the EFM signal from the encoder 17 and outputs to the laser driver 19. The laser driver 19 drives laser diode of the optical pick up 10 according to the modulated signal provided from and modulated by the strategy circuit 18 according to the EFM signal and the controlling signal of the laser power controlling circuit 20.

The laser power controlling circuit 20 outputs a signal that controls power of the laser light (light beam) irradiated from the laser diode of the optical pick up 10 to the laser driver 19. Concretely, the laser power controlling circuit 20 outputs a controlling signal to the laser driver 19 so that laser light with a most optimum laser power irradiated from the optical pick up 10 based on electric current value provided from the monitor diode of the optical pick up 10 and information representing a target value of an optimum laser power provided from the controlling unit 16.

The controlling unit 16 is consisted of a CPU, a ROM, a RAM and the like and controls each part of the optical disc recording apparatus 1 in accordance with a program stored in the ROM. The controlling unit 16 controls each part of the apparatus to execute test recording to a predetermined area of the optical disc D assigned to the optical disc recording apparatus before an actual recording of data as described in the above. Then, the controlling unit 16 executes a recording velocity judging process that obtains a recordable velocity of satisfactory recording without recording error to the optical disc D to which the optical disc recording apparatus 1 executes test recording by obtaining a relationship between the reproducing signal quality parameter and an apparatus recording parameter (recording condition) based on the reproducing signal quality such as the β value detected by the signal quality detecting circuit 24 from the signal obtained at a time of reproducing area executed the above test recording.

The storage unit 25 stores data obtained by an experiment and the like, a changing rate and a slope of change in a recording power function, y-intercept and the like. The operation unit 27 operates for selecting and inputting parameter representing the reproducing signal quality. The displaying unit 28 displays the reproducing signal quality of data recorded in the optical disc and the like.

Figure 3:
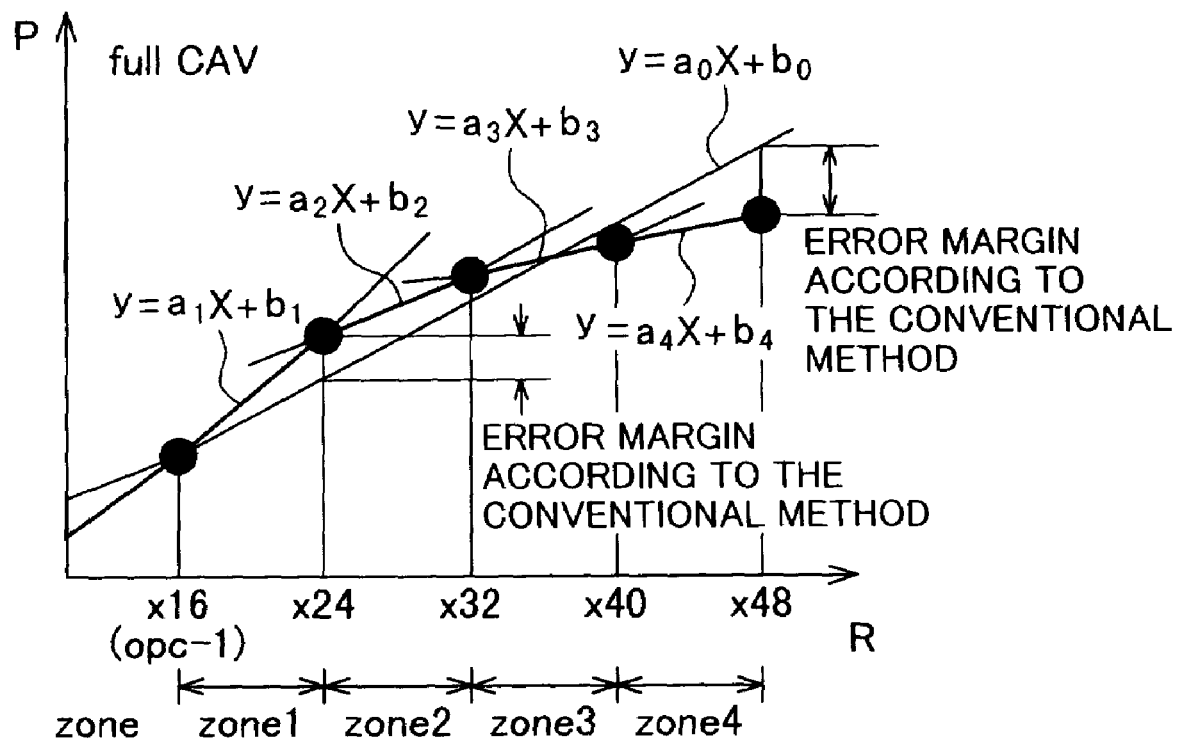
FIG. 3 is a graph showing a relationship between a recording velocity and a recording power of each of zones allocated in a direction of a radius of an optical disc.

The optical disc recording apparatus 1 with the above structure executes the following process for recording data with a recording power of an optimum light beam (a laser light) corresponding to the recording velocity. FIG. 3 is a graph showing a relationship between a recording velocity and a recording power of each of zones allocated in a direction of a radius of an optical disc. First, the optical disc recording apparatus 1 allocates a plurality of zones with predetermined width in a recording area to be recorded data with a CAV method (includes a CAV method part of a partial CAV method. Hereinafter the same). An allocating condition of zones with a predetermined width in the recording area may be changed corresponding to the recording velocity to the optical disc.

Also, a recording power function that represents a relationship between the recording velocity and the optimum recording power by each zone is assigned by executing the OPC in advance with a recording velocity corresponding to each zone by an experiment. The experiment to obtain the recording power function may be executed in the test area or the data recording area. Also, a recording power function assigned to each zone can be set to cross with an adjacent recording power function of the zone. So that a full recording power function in all over the recording area is defined zone by zone.

Next, when data is recorded, the optical disc recording apparatus 1 executes the test recording in the test area of the optical disc with a recording velocity corresponding to that in one zone that is selected from the recording velocity to be executed in plurality of zones before an actual writing to obtain an optimum recording power. Then, the recording power function of the selected zone, that is, selected based on this recording velocity and the optimum recording power at this velocity, is corrected and a recording power function of other zone is corrected. Then, when data (an actual data) is recorded, recording is executed in accordance with the optimum recording power obtained by the corrected recording power function of each zone.

Since recording power function of all recording area is set to cross the recording power function of each zone at the edge of the zone with an adjacent recording power function as described before, it is easy that the recording power function of other zone is corrected based on the recording power function of one zone. Therefore, correction of the recording power function of other zone may be executed at a time of correction of the recording power function of the selected zone or at a time of data recording.

However, by executing these methods; in the conventional recording method with the CAV method, as the maximum recording velocity becomes faster, the difference of the recording velocity (amount of velocity change) becomes larger, and a margin of error of the recording power becomes small, this defect can be improved by executing these methods, and data can be recorded with an optimum recording power at each recording velocity.

In the present invention, width of each zone is narrower than the all recording area, and the difference of the recording velocity between the minimum recording velocity and the maximum recording velocity of each zone is small. An optimum recording power can be obtained without having an error from the optimum value even if the recording power function of each zone is set to be a linear function. Therefore, the recording power function to be obtained by executing the experiment in advance may preferably be set to be a linear function. Also, since a simple linear function control is executed in each zone, an apparatus structure will be lower cost than the conventional apparatus. Moreover, when a width of a zone to be allocated in the recording area is narrowed to increase the number of zones, recording with a high precision can be realized.

Further, in the optical disc apparatus 1, a changing rate (it may be called a slope when it is a linear function) in the recording power function assigned to each zone is preferably descending toward the outer track side zone of an optical disc because as the recording velocity becomes faster, an amount of change (an amount of increase) in the optimum recording power gets small. Therefore, by choosing the changing rate as the above, a margin of error from the original optimum recording power is almost eliminated, and recording with a high precision can be realized.

Figure 4:
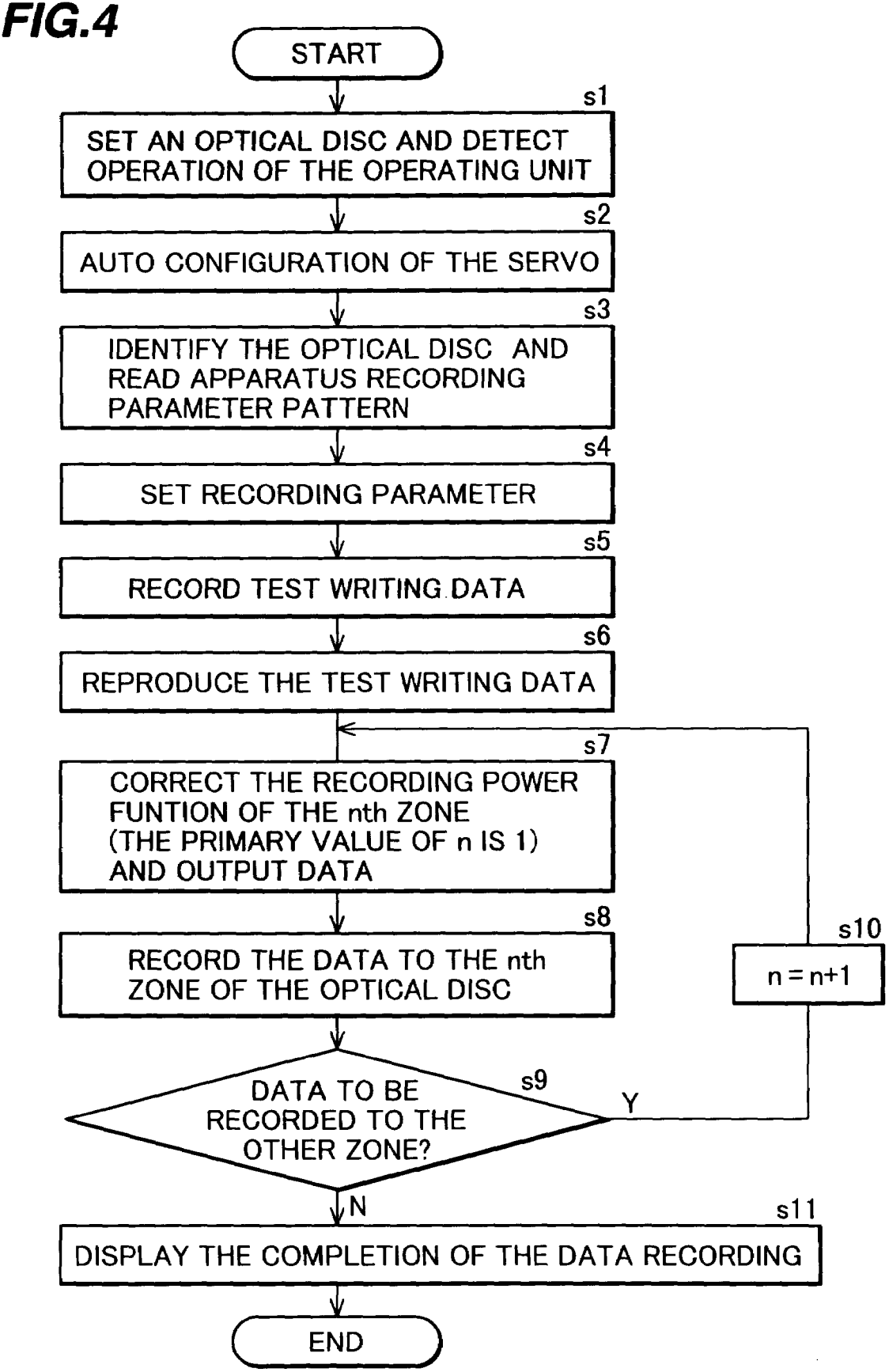
FIG. 4 is an example of flow charts for explaining an operation of an optical disc recording apparatus according to a first embodiment of the present invention.

Next, an operation of the optical disc recording apparatus 1 according to the first embodiment of the present invention is explained with examples by using FIGS. 3 and 4. FIG. 4 is an example of flow charts for explaining an operation of an optical disc recording apparatus according to a first embodiment of the present invention.

The optical disc recording apparatus 1 can record data in plural types of the optical discs. As shown in FIG. 3, a recording velocity can continuously be changed from 16× speed to 48× speed as an example. Also, for an easiness of the explanation, the optical disc recording apparatus 1 executes recording with 16× speed at a most inner track of a recording area and 48× speed at a most outer track of a recording area, and a recording velocity is changed linearly from the most inner track to the most outer track. The optical disc recording apparatus 1 executes processes in the below in advance. First, 4 zones are allocated in the recording area of the optical disc. The difference of the recording velocity (amount of velocity change) between the minimum recording velocity and the maximum recording velocity of each zone is 8× speed. That is, the recording velocity changes from 16× speed to 24× speed in a first zone (zone 1), 24× speed to 32× speed in a second zone (zone 2), 32× speed to 40× speed in a third zone (zone 3), and 40× speed to 48× speed in a fourth zone (zone 4).

Then the optical disc recording apparatus 1 obtains an optimum recording power by executing an OPC with a recording velocity at an edge of each zone in order to obtain a recording power function of each zone. That is, an optimum recording power is obtained with five velocities of 16× speed, 24× speed, 32× speed, 40× speed and 48× speed, and a linear function is obtained as a recording power function of each zone. The recording power function s assigned to each zone are $Y=a_1X+b_1$ in zone 1, $Y=a_2X+b_2$ in zone 2, $Y=a_3X+b_3$ in zone 3, and $Y=a_4X+b_4$ in zone 4, and slopes $a_1$ to $a_4$ are fixed values. Temporal values are obtained for y-intercepts $b_1$ to $b_4$, and they are corrected at a time of recording to decide finally. These set recording power function s are stored in a storage unit 25. Since the recording power function s are set by executing the OPC at the recording velocity at each edge, the recording power function s assigned to each zone cross with a recording power function of an adjacent zone at a recording velocity at the edge of each zone. Moreover, the optical disc recording apparatus 1 can record data in plural types of the optical discs, and the storage unit 25 stores data concerning to the recording power function assigned to each zone by type of the optical disc. Moreover, data concerning to the recording power function s assigned to each zone may be operated as, for example, a firmware.

A procedure to record data in an optical disc (for example, a CD-R) by an optical disc recording apparatus 1 is as follows. First, a user sets the CD-R for recording data in the optical disc recording apparatus 1, and executes an operation for recording data in the operation unit 27. A controlling unit 16 executes an automatic configuration of a servo in order to judge a type of the set optical disc for recording, and outputs predetermined signals to each of a servo circuit 13, a laser power controlling circuit 20 and an encoder 17 (s1). When these signals are output, an optical pick up 10 moves to a predetermined position and irradiates a laser light (a light beam) to the optical disc for recording. A receiving device of the optical pick up 10 receives a returning light of the irradiated light and outputs an electrical signal corresponding to an amount of light received to a RF amplifier 12. The RF amplifier 12 amplifies this signal to output to an ATIP detecting circuit 14, and ATIP information (identification information of the optical disc and the like) is detected in the ATIP detecting circuit 14 to output to a controlling unit 16 (s2). The controlling unit 16 judges a type of the optical disc based on this signal, and reads data pattern of an apparatus recording parameter from the storage unit 25 (s3).

Then, the controlling unit 16 sets an apparatus recording parameter concerning to a reproducing signal quality based on this data (s4). Next, the controlling unit 16 outputs predetermined signals to the servo circuit 13, laser power controlling circuit 20 and the encoder 17 in order to execute the OPC at one velocity, and a test recording of test recording data is executed to a PCA (s5). Moreover, the OPC is executed with 16× speed that is an initial recording velocity.

Next, the controlling unit 16 makes the optical pick up irradiate a laser light in order to reproduce the test-recorded region. The returning light is received by the receiving device of the optical pick up 10 and converted to an electrical signal to output to the RF amplifier 12. The RF amplifier 12 outputs the amplified signal to a signal quality detecting circuit 24 (s6). The signal quality detecting circuit 24 outputs a signal concerning to a signal quality of the reproducing signal to the controlling unit 16, and the controlling unit 16 sets an optimum laser power based on the signal output from the signal quality detecting circuit 24 and the like. Also, the recording power function of zone 1 (n zone: an initial value n=1) is corrected by using the set optimum laser power and the recording velocity. That is, y-intercept $b_1$ of the recording power function of zone $1Y=a_1X+b_1$ is obtained. Then the controlling unit 16 outputs data to be recorded in the optical disc for recording output from a host apparatus (not shown in the figure) (s7). This data is irradiated as a laser light from the optical pick up 10 via an encoder 17, a strategy circuit 18 and a laser driver 19, and data is recorded in zone 1 of the optical disc (s8). At this time, a laser power controlling circuit 20 controls the laser driver 19 so that a light beam of the laser power in accordance with the recording power function of zone 1, $Y=a_1X+b_1$, is irradiated from the optical pick up.

The controlling unit 16 judges whether there is data to record in a next zone (n+1 zone) or not when data-recording advances in zone 1 and approaches at an edge of zone 1 (s9).

In a case that data-recording follows, n=n+1 (s10), and a recording power function of zone 2 (zone n) read from the storage unit 25 is corrected from a recording velocity and a recording power at that time (at the time of recording to the edge of zone 1 and zone 2). That is, y-intercept $b_2$ of the recording power function of zone $2Y=a_2X+b_2$ is obtained. Then the controlling unit 16 outputs data to be recorded in the optical disc for recording output from a host apparatus (not shown in the figure) (s7). This data is irradiated as a laser light from the optical pick up 10 via an encoder 17, a strategy circuit 18 and a laser driver 19, and data is recorded in the optical disc (s8). At this time, a laser power controlling circuit 20 controls the laser driver 19 so that a light beam of the laser power in accordance with the recording power function of zone 2, $Y=a_2X+b_2$, is irradiated from the optical pick up. The controlling unit 16 judges whether there is data to record in a next zone (n+1 zone) or not when data-recording advances in zone 2 and approaches at an edge of zone 2 (s9).

As doing the above, the same processes are repeated in zone 3 and zone 4. Then, when data is recorded at an edge of zone 4, and when data-recording is completed, the optical disc recording apparatus 1 makes a displaying unit 28 display that data-recording has completed (s11) to finish recording process because there is no more data to record (s9).

In the above embodiment 1–1, a method to record data with an optimum recording quality by obtaining an optimum recording power of a light beam corresponding to a recording velocity based on a recording power function is explained. The optical disc recording apparatus 1 can realize a method to record data with an optimum recording quality by obtaining a recording power controlling waveform (write strategy) 30 of a light beam, and this method is explained in the present embodiment.

Figure 5A:
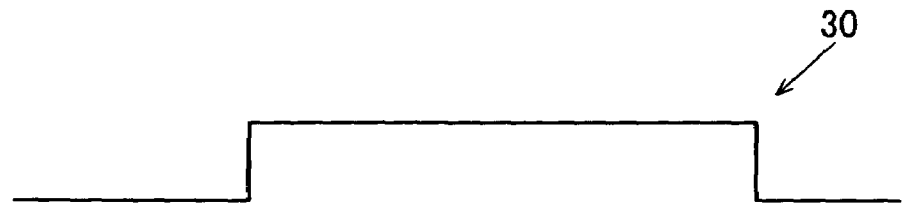
FIG. 5 is a waveform figure of a recording waveform and a write strategy processing waveform.
Figure 5B:
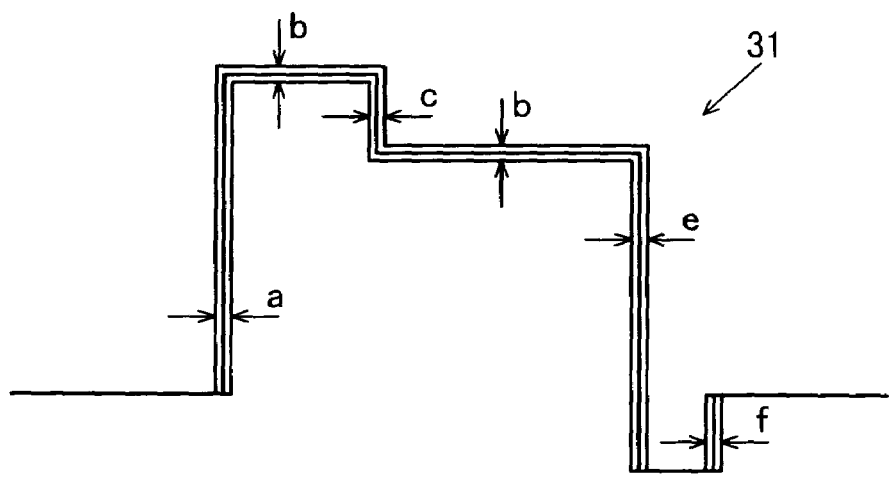
Figure 5C:
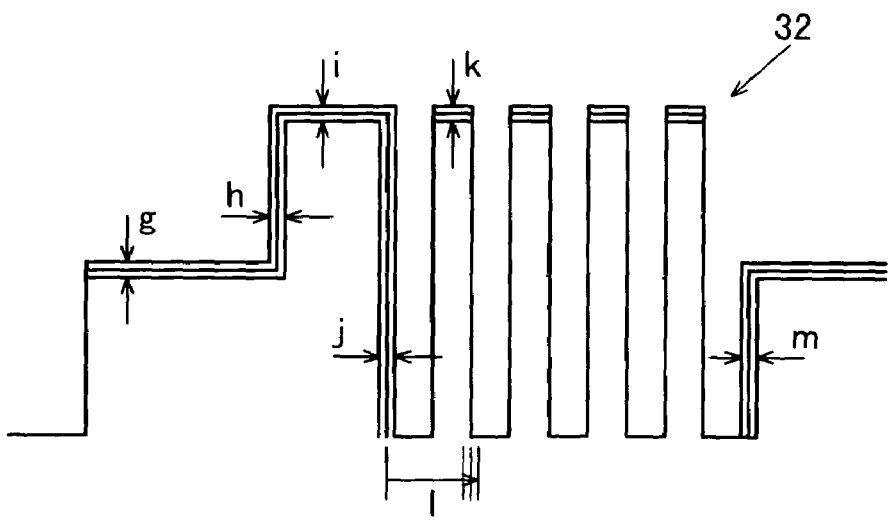

FIG. 5 is a waveform figure of a recording waveform and a write strategy processing waveform. In order to record a recording waveform (EFM) shown in FIG. 5A in an optical disc, conventionally, a laser power control is executed with a write strategy with a waveform shown in FIG. 5B and FIG. 5C. Also, materials of the optical discs are different depending on types of the optical discs, and an optimum recording power is also different corresponding to that. Therefore, the conventional optical disc recording apparatus controls the laser power with write strategy that is different corresponding to the optical disc.

Also, when the conventional optical disc recording apparatus controls the laser power with a write strategy as a write strategy processing waveform 31 (hereinafter called a waveform 31) of write-once type and a mono-pulse type shown in FIG. 5B, each parameter of the waveform 31 is set to be an appropriate value. That is, the conventional optical disc recording apparatus sets parameters such as a laser light irradiating starting timing a, a powered pulse height b, a powered pulse ending timing c, a recording power height d, a recording pulse ending timing e, an off pulse process ending timing f and the like to be appropriate values corresponding to types of the optical discs, and obtains a signal with an optimum recording quality.

Also, when the conventional optical disc recording apparatus controls the laser power with a write strategy such as a write strategy processing waveform 32 (hereinafter called a waveform 32) of an erasable type and a multi-pulse type shown in FIG. 5C, it sets each parameter of the waveform 32 to be an appropriate value. That is, the conventional optical disc recording apparatus sets parameters such as an erasing power height g, a first pulse starting timing h, a first pulse power height i, a first pulse ending timing j, a following pulse power height k, a following pulse frequency 1, a last pulse ending timing m and the like to be appropriate values corresponding to types of the optical discs, and obtains a signal with an optimum recording quality.

An optical disc recording apparatus 1 according to the present embodiment allocates zones with a predetermined width in a recording area to execute data-recording with a CAV method as same as an optical disc recording apparatus according to the embodiment 1–1. Also, an OPC is executed with a recording velocity corresponding to each zone by an experiment in advance, and recording parameter function s represent relationships between the recording velocity and a parameter of a write strategy are set by each zone. By that, a full recording parameter function of all recording area can be defined zone by zone. The experiment for obtaining the recording parameter function s may be executed in a test area or in a data recording area. Also, the recording parameter function s assigned to each zone that is allocated in the recording area of the optical disc is set to cross with a recording parameter function of an adjacent zone at a time of a recording velocity at an edge of the zone.

When the optical disc recording apparatus 1 records data, it obtains an optimum value of the parameter by executing test recording in a test area of the optical disc at one recording velocity corresponding to that in one zone chosen from a plurality of zones before an actual writing. Then, the recording power function of the zone selected based on this recording velocity and the optimum recording power is corrected and a recording power function of other zone is corrected. Then, when data (an actual data) is to be recorded, recording is executed in accordance with the optimum recording power derived from the corrected recording power function of each zone.

However, in the conventional recording method with the CAV method, as the maximum recording velocity becomes larger, the difference of the recording velocity (amount of velocity change) becomes larger, but this defect can be improved by executing these methods. Also, data can be recorded with more optimum recording quality than that of the embodiment 1–1 by correcting a part or all parameter of the write strategy by the above method.

Here, the recording parameter function to be obtained by executing the experiment in advance may preferably be set to be a linear function as same as the recording power function according to the embodiment 1–1. Further, a changing rate in the recording parameter function set to each zone is preferably descending toward the outer track side zone of an optical disc. The ground of descending is omitted because it is same as the embodiment 1–1.

Next, an operation of the optical disc recording apparatus in an embodiment 1–2 according to the first embodiment of the present invention is explained. In an explanation of a below operation, a case that a recording power height d of a waveform 31 is controlled as same as FIG. 3 is explained. An operation of the optical disc recording apparatus 1 according to the embodiment of the present invention is same as an operation wherein, for example, the recording power of the embodiment 1–1 is defined as the recording power height d of the waveform shown in FIG. 4 by reading the explanation of the operation in the embodiment 1–1 with the below, and the explanation is omitted.

That is, by reading "a recording power function " with "a recording parameter function ", "a optimum laser power" with "an optimum value of the parameter", "a light beam according to a recording power function " with "a light beam of write strategy adapted a parameter according to a recording parameter function ", etc., an explanation of an operation in the embodiment 1–1 is a same explanation as the recording power in the embodiment 1–1 to be a recording power height d in the waveform 31 shown in FIG. 4.

However, a method to record data with an optimum recording quality by obtaining an optimum recording power of a light beam corresponding to a recording velocity based on a recording power function in the embodiment 1–1 is explained, the recording power function represent a relationship between the recording velocity and the recording power of the light beam. Also, the recording power is one of parameters of the recording power controlling waveform (the write strategy) of the light beam explained in the embodiment 1–2. Therefore, the embodiment 1–1 is a method to record data with an optimum recording quality by obtaining a function concerning to the recording power that is one of parameters of the recording power controlling waveform (the write strategy) of the light beam explained in the embodiment 1–2.

Next, an operation of the optical disc recording apparatus according to the second embodiment of the present invention is explained. An optical disc recording apparatus 2 according to a second embodiment of the present invention has a same structure as the optical disc recording apparatus 1 according to the first embodiment of the present invention, and details of the structure will be omitted.

Figure 6A:
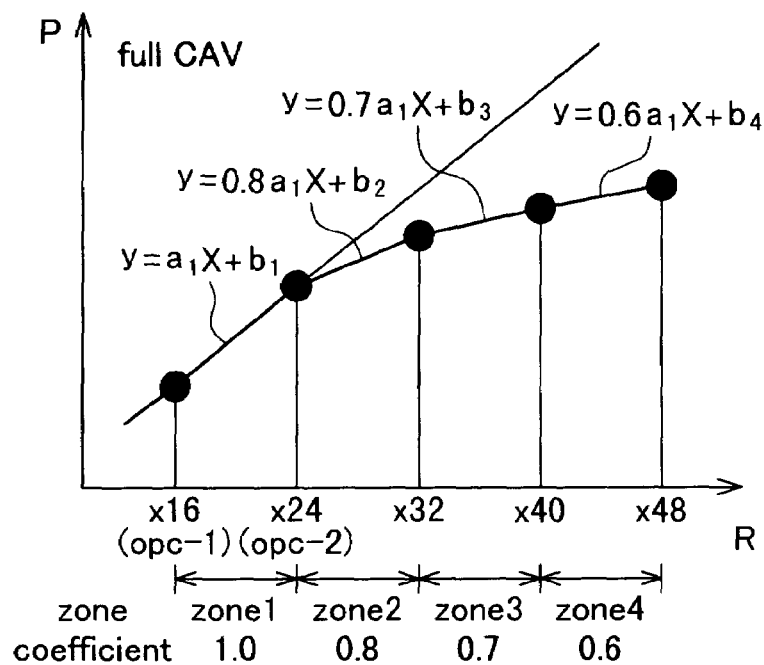
FIG. 6 is a graph showing a relationship between a recording velocity and a recording power.
Figure 6B:
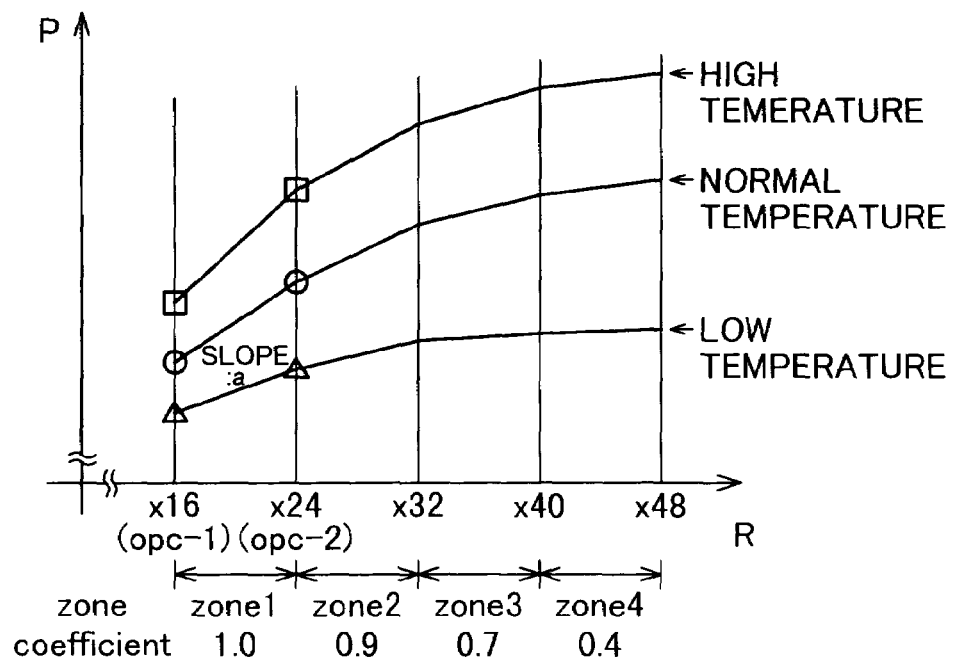

FIGS. 6A and 6B are graphs, each showing a relationship between a recording velocity and a recording power. An optical disc recording apparatus 2 with a structure as the above allocates zones with a predetermined width in a recording area when data-recording is executed with a CAV method as same as an optical disc recording apparatus 1. Also, an OPC is executed with a recording velocity corresponding to each zone by an experiment in advance, and an optimum recording power is obtained to obtain a recording power function s. These are executed by type of the optical discs, and they are stored in a storage unit 25 in the optical disc recording apparatus 2. The experiment for obtaining the recording power function s may be executed in a test area or in a data recording area. Also, the recording parameter function s assigned to each zone that is allocated in the recording area of the optical disc is set to cross with a recording parameter function of an adjacent zone at a time of a recording velocity at an edge of the zone.

Further, in the optical disc apparatus 2, a changing rate in the recording power function set to each zone is preferably descending toward the outer track side zone of an optical disc. Therefore, by choosing the changing rate as the above, a margin of error from the original optimum recording power is almost eliminated, and recording with a high precision can be realized.

A coefficient is assigned to order to obtain a recording power function of other each zone based on a recording power function in a predetermined zone. The coefficient of each zone may be, for example, a coefficient to a changing rate (a slope) in the recording power function in one zone as shown in FIG. 6A.

Moreover, when data is recorded, test recording is executed in a test area in the optical disc at two velocities corresponding to those in one of the plurality of the zones (a predetermined zone) before an actual data-recording to obtain an optimum recording power. Further, A minimum recording velocity and a maximum recording velocity are ideal for two velocities in the above predetermined zone. Also, the test recording can be performed to the inner PCA area or the outer PCA area selectively in accordance with the recording velocity.

Then, a changing rate in the recording power function in the zone and other zone with the obtained optimum recording power is corrected based on the coefficient to the changing rate (a slope) in the recording power function in the predetermined zone. Moreover, this correction may be executed in advance or during recording data based on the recording power at the edge of the zone. Then, when data (an actual data) is recorded, recording is executed in accordance with the optimum recording power obtained by the corrected recording power function of each zone.

However, by executing these methods, in the conventional recording method with the CAV method, as the maximum recording velocity becomes faster, the difference of the recording velocity (amount of velocity change) becomes larger, and an error of the recording power becomes larger, this defect can be improved by executing these methods, and data can be recorded with an optimum recording power at each recording velocity.

Here, the recording power function to be obtained by executing the experiment in advance may preferably be set to be a linear function. In the conventional method, since the difference in the recording velocity is large, margin of error is also large. In the second embodiment of the present invention, since a width in each zone is narrower than that of the whole recording area, the difference in the recording velocity between the minimum recording velocity and the maximum recording velocity of each zone is small. Therefore, an optimum recording power can be obtained without a problem even if the recording power function of each zone is set to be a linear function. Also, since a simple linear function control is executed in each zone, an apparatus structure will be lower cost than the conventional apparatus. Moreover, when a width of a zone to be allocated in the recording area is narrowed to increase the number of zones, recording with a high precision can be realized.

Also, in the second embodiment of the present invention, since the OPC is executed at two velocities corresponding to those in a predetermined zone, a changing rate in the recording power function (a slope in a case of a linear function) in the zone can easily be calculated. That is, the changing rate in the recording power function is different depending on a wave length of the light beam that is irradiated to the optical disc, a peripheral temperature, a type of the optical disc, dispersion of the optical disc recording apparatus and the like. Therefore, data in each zone is obtained with the above conditions in advance; the dispersion by the above conditions can be prevented by executing the OPC at two velocities to obtain the slope of the recording power function for the zone. For example, as shown in FIG. 6B, a dispersion of the recording quality by the dispersion of the peripheral temperature can be prevented by obtaining relationships between the recording velocity at low, normal, and high temperatures and a recordable power in each zone according to the peripheral temperature.

Further, in the optical disc apparatus 2, a changing rate in the recording power function set to each zone is preferably descending toward the outer track side zone of an optical disc because as the recording velocity becomes faster, an amount of change (an amount of increase) in the optimum recording power gets small. Therefore, by choosing the changing rate as the above, an error from the original optimum recording power is almost eliminated, and recording with a high precision can be realized.

Next, an operation of the optical disc recording apparatus 2 according to the second embodiment of the present invention is explained with examples by using FIGS. 6A and 4. Different points from the operation of the optical disc recording apparatus according to the first embodiment of the present invention are mainly explained.

The optical disc recording apparatus 2 can record data in plural types of the optical discs, and a recording velocity can continuously be changed from 16× speed to 48× speed as an example as same as the optical disc recording apparatus 1. Also, 4 zones are allocated in the recording area of the optical disc. The difference of the recording velocity between the minimum recording velocity and the maximum recording velocity of each zone is 8× speed. That is, the recording velocity changes from 16× speed to 24× speed in a first zone (zone 1), 24× speed to 32× speed in a second zone (zone 2), 32× speed to 40× speed in a third zone (zone 3), and 40× speed to 48× speed in a fourth zone (zone 4).

Then, in the optical disc recording apparatus 2, an optimum recording power is obtained by executing an OPC at 5 recording velocities in order to obtain a recording power function for each zone. That is, an optimum recording power is obtained at five velocities of 16× speed, 24× speed, 32× speed, 40× speed and 48× speed, and a linear function is obtained as a recording power function of each zone. Also, slopes of the recording power function s in zones 2 to 4 is set to be able to be obtained from a coefficient to a slope of the recording power function in zone 1 which is a predetermined zone. That is, the recording power function s assigned to each zone are $Y=a_1X+b_1$ in zone 1, $Y=0.8a_1X+b_2$ in zone 2, $Y=0.7a_1X+b_3$ in zone 3, and $Y=0.6a_1X+b_4$ in zone 4. These set recording power function s are stored in a storage unit 25. Moreover, the optical disc recording apparatus 2 can record data in plural types of the optical discs, and the storage unit 25 stores data concerning to the recording power function s assigned to each zone by type of the optical disc.

When data is recorded in an optical disc (for example, a CD-R) by the optical disc recording apparatus 2, processes from Steps s1 to s4 are executed as same as the optical disc recording apparatus 1. Next, the controlling unit 16 outputs predetermined signals to the servo circuit 13, laser power controlling circuit 20 and the encoder 17 in order to execute the OPC at two velocities, and a test recording of test recording data is executed to a PCA (s5). Moreover, the OPC is executed at 16× speed that is a minimum recording velocity and 24× velocity that is a maximum recording velocity.

Next, the controlling unit 16 reproduces the test-recorded point. The returning light is received by the receiving device of the optical pick up 10 and converted to an electrical signal. The RF amplifier 12 outputs the amplified signal to a signal quality detecting circuit 24 (s6). The controlling unit 16 sets an optimum laser power based on the signal output from the signal quality detecting circuit 24 and the like. Also, the recording power function of zone 1 (n zone: an initial value n=1) is corrected by using the set optimum laser power and the recording velocity. That is, a slope $a_1$ and y-intercept $b_1$ of the recording power function of zone 1 $Y=a_1X+b_1$ is obtained. Then the controlling unit 16 outputs data to be recorded in the optical disc for recording output from a host apparatus (not shown in the figure) (s7). Moreover, in zones 2 to 4, coefficients of slopes are read from the storage unit, and a slope is a value that is multiplied the coefficient on the slope $a_1$ of the recording power function $Y=a_1X+b_1$ Also, y-intercepts $b_2$ to $b_4$ is obtained from the recording power values at a maximum recording velocity of a prior zone.

This data is irradiated as a laser light from the optical pick up 10 via an encoder 17, a strategy circuit 18 and a laser driver 19, and data is recorded in zone 1 of the optical disc (s8). At this time, a laser power controlling circuit 20 controls the laser driver 19 so that a light beam of the laser power in accordance with the recording power function of zone 1, $Y=a_1X+b_1$, is irradiated from the optical pick up.

The controlling unit 16 judges whether there is data to record in a next zone (n+1 zone) or not when data-recording advances in zone 1 and approaches at an edge of zone 1 (s9). Then, same processes are repeated in zones 2 to 4 (s7 to s10). Then, when data is recorded at an edge of zone 4, and when data recording is completed, the optical disc recording apparatus 1 makes a displaying unit 28 display that data-recording has completed to finish recording process (s11).

In the optical disc recording apparatus 2 according to the second embodiment, instead of the method to record data with an optimum recording quality by obtaining an optimum recording power of a light beam corresponding to a recording velocity based on a recording power function, a method to record data with an optimum recording quality by obtaining a recording power controlling waveform (write strategy) can be executed as same as the optical disc recording apparatus 1 according to the first embodiment.

That is, an optical disc recording apparatus 2 according to the second embodiment allocates zones with a predetermined width in a recording area to be recorded with a CAV method as same as an optical disc recording apparatus 2 according to the embodiment 2–1. Also, an OPC is executed at a recording velocity corresponding to that in each zone by an experiment in advance, and an optimum recording power is obtained to obtain an optimum recording parameter function s. These are executed by type of the optical discs, and they are stored in a storage unit 25 in the optical disc recording apparatus 2. The experiment for obtaining the optimum recording parameter function s may be executed in a test area or in a data recording area.

A coefficient is assigned to order to obtain a recording parameter function of other each zone based on a recording power function in a predetermined zone. The coefficient of each zone may be, for example, a coefficient to a changing rate (a slope) in the recording parameter function in one zone as shown in FIG. 6A.

Moreover, when data is recorded, test recording is executed in a test area in the optical disc at two velocities corresponding to those in one of the plurality of the zones (a predetermined zone) before an actual data-recording to obtain an optimum value of parameters. Further, a minimum recording velocity and a maximum recording velocity are ideal for two velocities in the above predetermined zone. Also, the test recording can be performed to the inner PCA area or the outer PCA area selectively in accordance with the recording velocity.

Then, a changing rate (a slope) in the recording parameter function in a predetermined zone with the obtained optimum value of parameters at the obtained recording velocity is corrected, and a changing rate (a slope) in the recording parameter function in other zone is corrected based on the coefficient to the changing rate (a slope) in the recording parameter function in the predetermined zone. Moreover, this correction may be executed in advance or during recording data based on the recording power at the edge of the zone. Then, when data (an actual data) is to be recorded, recording is executed by irradiating a light beam of write strategy that adapts an ideal value of the parameter derived from the corrected recording parameter function in each zone.

However, by executing these methods, in the conventional recording method with the CAV method, as the maximum recording velocity becomes faster, the difference of the recording velocity (amount of velocity change) becomes larger, and an error of the recording power becomes larger, this defect can be improved by executing these methods, and data can be recorded by irradiating the light beam of the write strategy adapting the optimum value of the parameter in each recording velocity.

Here, the recording power function to be obtained by executing the experiment in advance may preferably be set to be a linear function. Further, a changing rate in the recording parameter function set to each zone is preferably descending toward the outer track side zone of an optical disc. The ground of descending is omitted because it is same as the embodiment 2–1.

Also, in the second embodiment of the present invention, since the OPC is executed at two velocities in a predetermined zone, a changing rate in the recording parameter function in the zone can easily be calculated. That is, the changing rate in the recording parameter function is different depending on a wave length of the light beam that is irradiated to the optical disc, a peripheral temperature, a type of the optical disc, dispersion of the optical disc recording apparatus and the like. Therefore, data in each zone is obtained with the above different conditions in advance; the dispersion by the above conditions can be prevented by executing the OPC at two velocities to obtain the changing rate (the slope) of the recording parameter function in the zone. For example, as shown in FIG. 6B, a dispersion of the recording quality by the dispersion of the peripheral temperature can be prevented by obtaining relationships between the recording velocity at low, normal, and high temperatures and the write strategy parameter in each zone according to the peripheral temperature.

Here, an abstract explanation for an operation in an embodiment 2–2 of the optical disc recording apparatus according to the second embodiment of the present invention is omitted because the operation is same as the embodiment 1–2.

Next, an operation of the optical disc recording apparatus according to the third embodiment of the present invention is explained. An optical disc recording apparatus 3 according to a third embodiment of the present invention has a same structure as the optical disc recording apparatus 1 according to the first embodiment of the present invention, and details of the structure will be omitted.

Figure 7:
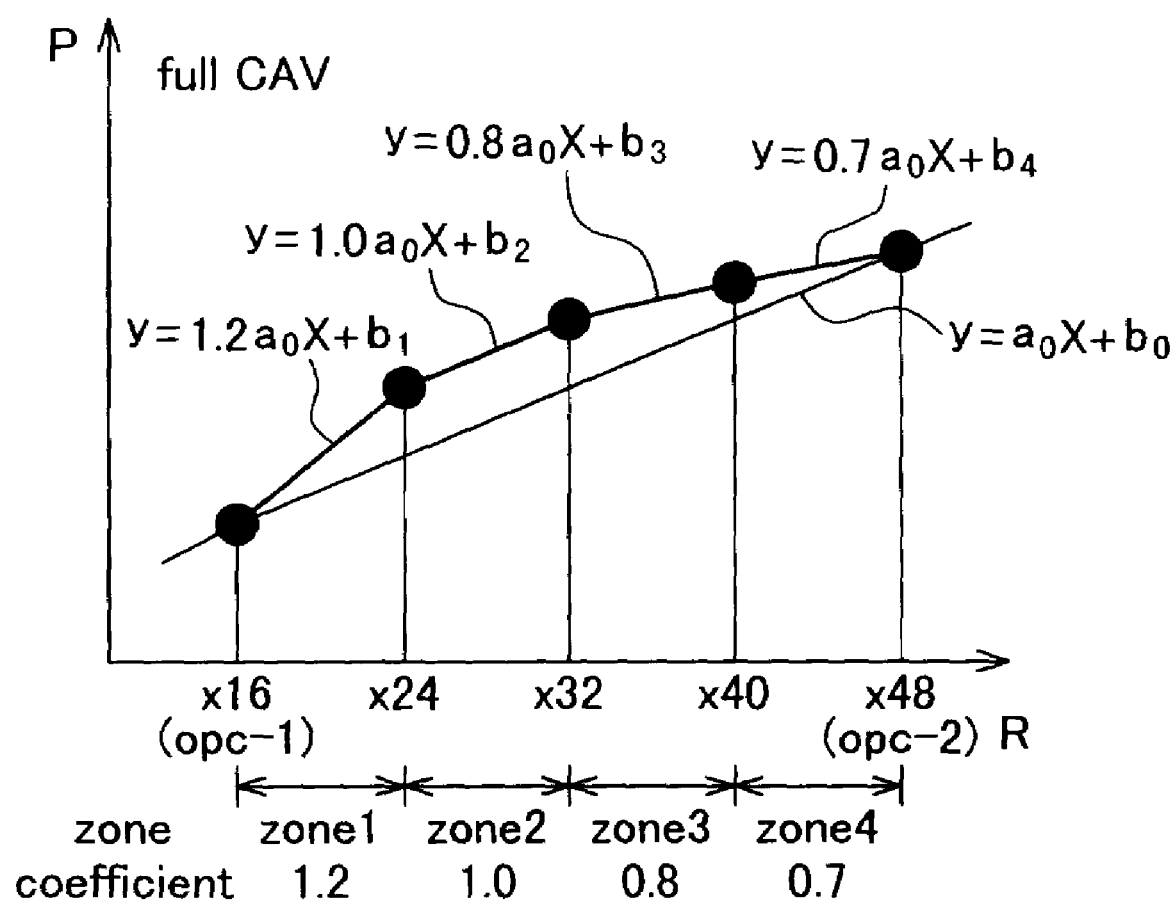
FIG. 7 is a graph showing a relationship between a recording velocity and a recording power.
Figure 8A:
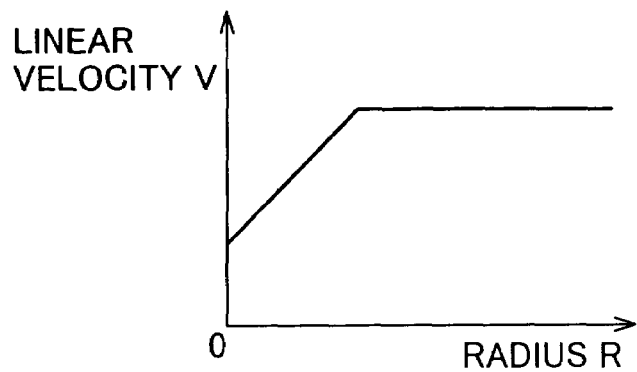
FIG. 8 is a relationship diagram between a radius position and a linear velocity in each of recording methods.
Figure 8B:
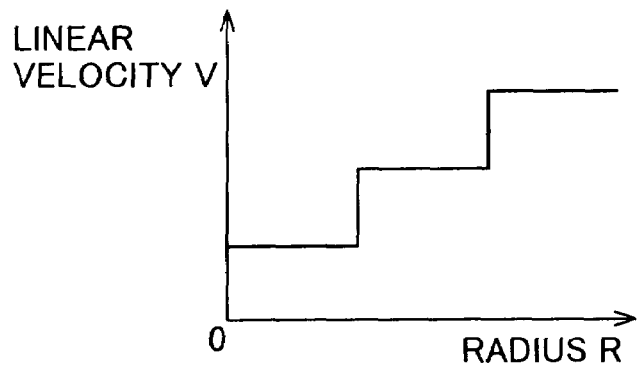
Figure 8C:
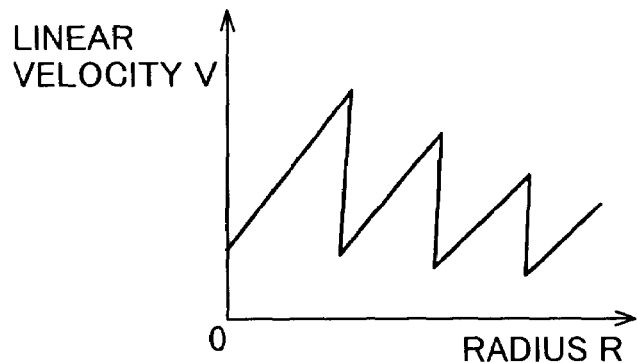
Figure 8D:
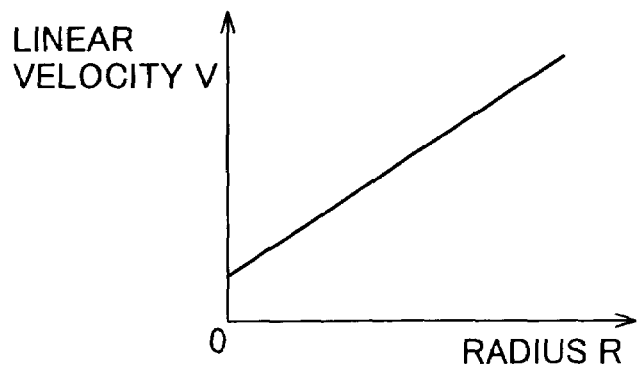
Figure 9:
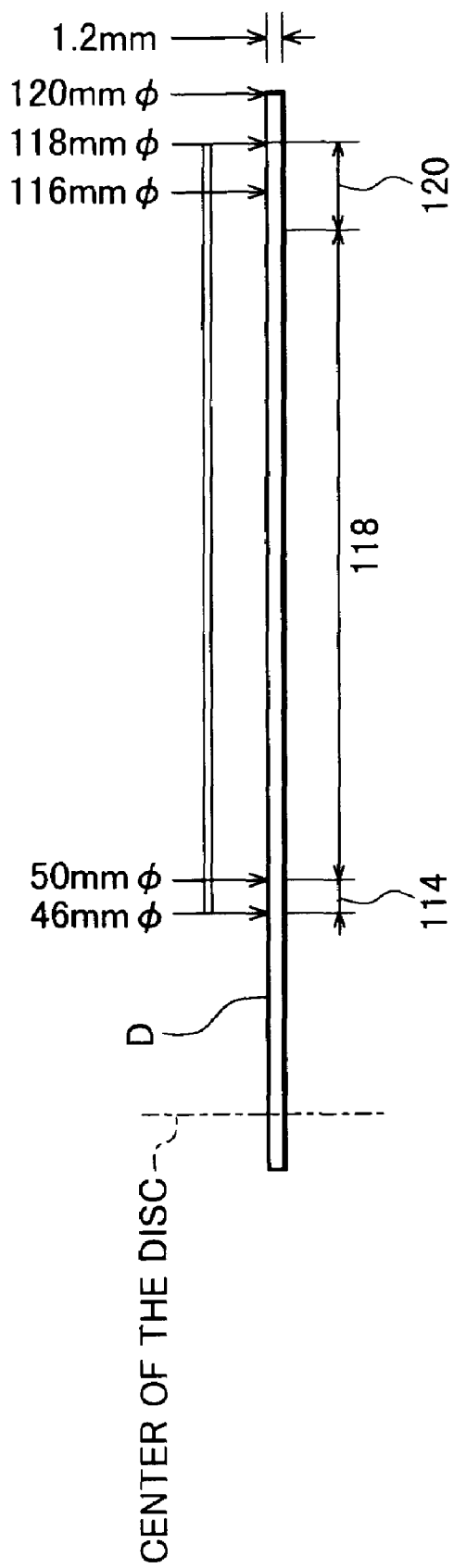
FIG. 9 is a cross sectional view showing an area structure of a CD-R/RW that is an example of an optical disc.
Figure 10A:
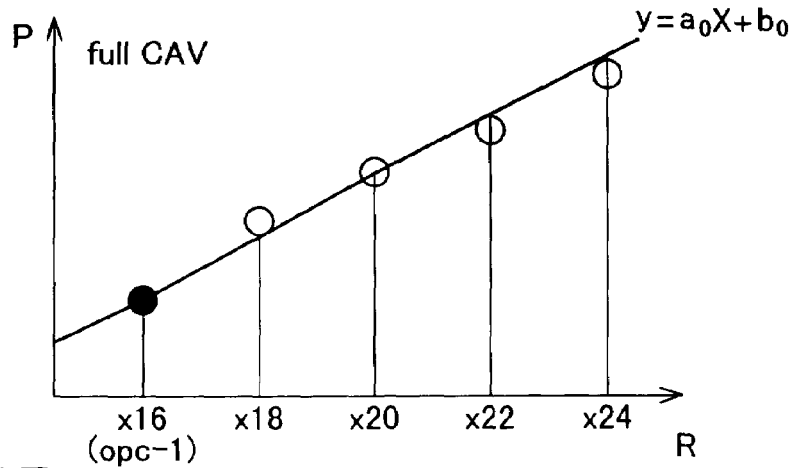
FIG. 10 is a character chart of a recording power function.
Figure 10B:
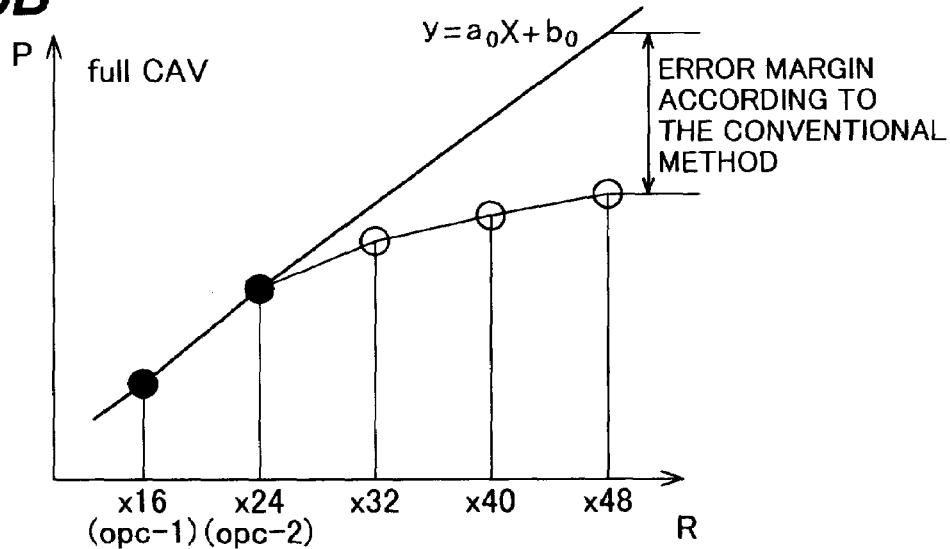
Figure 10C:
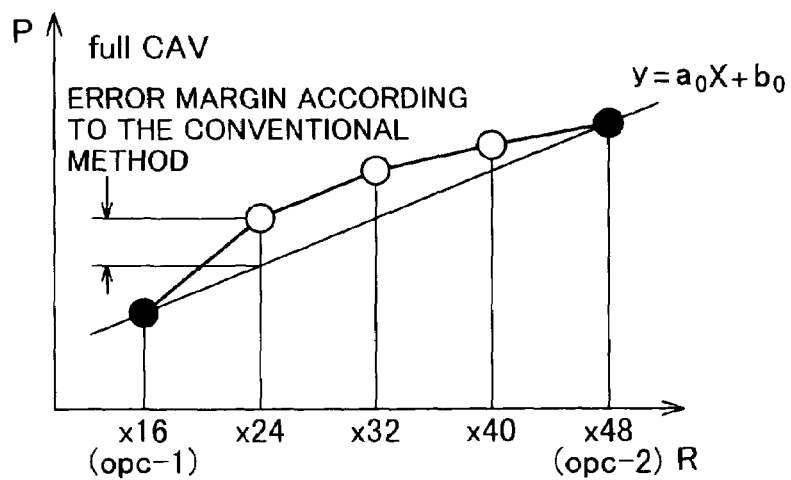

FIG. 7 is a graph showing a relationship between a recording velocity and a recording power. An optical disc recording apparatus 3 with a structure as the above allocates zones with a predetermined width in a recording area when data recording is executed with a CAV method as same as an optical disc recording apparatus 1. Also, an OPC is executed with a recording velocity corresponding to a recording area in each zone by an experiment in advance, and an optimum recording power is obtained to obtain a recording power function s. Also, a slope of the recording power function (hereinafter called a full recording power function) is obtained based on a minimum recording velocity and a maximum recording velocity of recording velocities to be executed in all zones (a full recording area). These are executed by type of the optical discs, and they are stored in a storage unit 25 in the optical disc recording apparatus 3. The experiment for obtaining the recording power function s may be executed in a test area or in a data recording area. Also, the recording parameter function s assigned to each zone that is allocated in the recording area of the optical disc is set to cross with a recording parameter function of an adjacent zone at a time of a recording velocity at an edge of the zone.

Each coefficient is set for obtaining a recording power function of each zone based on the full recording power function in the above. Further, as each coefficient, coefficient to a slope of the full recording power function or a tangent may be obtained by each zone. Also, coefficient for zone 1 may be only obtained as a coefficient to a slope of the full recording power function, and coefficient for other zones may be obtained as a coefficient to a slope of other adjacent prior zone (an inner track side zone).

Moreover, when data is to be recorded, test recording is executed in a test area in the optical disc at two recording velocities of a minimum recording velocity and a maximum recording velocity corresponding to those in full of the plurality of the zones before an actual data-recording to obtain an optimum recording power. Then, a slope in the full recording power function is obtained based on the obtained recording power and the recording velocity, and the recording power function in each zone is corrected based on each of the coefficient of the recording power function to the slope of this full recording power function. Moreover, this correction may be executed in advance or during recording data based on the recording power at the edge of the zone. Then, when data (an actual data) is to be recorded, recording is executed in accordance with the optimum recording power derived from the corrected recording power function of each zone.

However, by executing these methods, in the conventional recording method with the CAV method, as the maximum recording velocity becomes faster, an error of the recording power becomes larger in an intermediate area of the recording area, this defect can be improved by executing these methods, and data can be recorded with an optimum recording power at each recording velocity.

Here, the recording power function to be obtained by executing the experiment in advance may preferably be set to be a linear function. In the conventional method, since the difference in the recording velocity is large, error is also large. In the third embodiment of the present invention, since a width in each zone is narrower than that of the whole recording area, the difference in the recording velocity between the minimum recording velocity and the maximum recording velocity of each zone is small. Therefore, an optimum recording power can be obtained without a trouble even if the recording power function of each zone is set to be a linear function. Also, since a simple linear function control is executed in each zone, an apparatus structure will be lower cost than the conventional apparatus. Moreover, when a width of a zone to be allocated in the recording area is narrowed to increase the number of zones, recording with a high precision can be realized.

Further, in the optical disc apparatus 3, a changing rate in the recording power function set to each zone is preferably descending toward the outer track side zone of an optical disc because as the recording velocity becomes faster, an amount of change (an amount of increase) in the optimum recording power gets small. Therefore, by choosing the changing rate as the above, an error from the original optimum recording power is almost eliminated, and recording with a high precision can be realized.

Next, an operation of the optical disc recording apparatus according to the third embodiment of the present invention is explained with examples by using FIGS. 7 and 4. Different points from the operation of the optical disc recording apparatus according to the second embodiment of the present invention are mainly explained.

The optical disc recording apparatus 3 can record data in plural types of the optical discs, and a recording velocity can continuously be changed from 16× speed to 48× speed as an example as same as the optical disc recording apparatus 1. Also, 4 zones are allocated in the recording area of the optical disc. The difference of the recording velocity between the minimum recording velocity and the maximum recording velocity of each zone is 8× speed. That is, the recording velocity changes from 16× speed to 24× speed in a first zone (zone 1), 24× speed to 32× speed in a second zone (zone 2), 32× speed to 40× speed in a third zone (zone 3), and 40× speed to 48× speed in a fourth zone (zone 4).

Also, in the optical disc recording apparatus 3, an optimum recording power is obtained by executing an OPC at 5 recording velocities in order to obtain a recording power function in each zone. That is, an optimum recording power is obtained at five velocities of 16× speed, 24× speed, 32× speed, 40× speed and 48× speed, and a linear function is obtained as a recording power function in each zone. Also, slopes of the recording power function s in zones 1 to 4 is obtained from a coefficient to a slope of the recording power function (full recording power function) in all areas of zones 1 to 4. That is, when the recording power function s of all zones of 1 to 4 (hereinafter also called full recording power function) are $Y=a_0X+b_0$, recording power function s in each zone are $Y=1.2a_0X+b_1$ in zone 1, $Y=1.0a_0X+b_2$ in zone 2, $Y=0.8a_0X+b_3$ in zone 3, and $Y=0.7a_0X+b_4$ in zone 4.

Also, coefficient for zone 1 may be obtained as a coefficient to a slope of the full recording power function, and coefficient for other zones may be obtained as a coefficient to a slope of other adjacent prior zone (an inner track side zone). In this case, when the recording power function s of all zones of 1 to 4 are $Y=a_0X+b_0$, recording power function s in each zone are $Y=1.200a_0X+b_1$ in zone 1, $Y=0.833a_0X+b_2$ in zone 2, $Y=0.800a_0X+b_3$ in zone 3, and $Y=0.875a_0X+b_4$ in zone 4.

These set full recording power functions and recording power function s are stored in a storage unit 25. Moreover, the optical disc recording apparatus 3 can record plural types of optical disc data as the above, and data concerning to the recording power function s assigned to each zone is stored in the storage unit 25 by the type of the optical disc.

When data is recorded in an optical disc (for example, a CD-R) by the optical disc recording apparatus 3, processes from Steps s1 to s4 are executed as same as the optical disc recording apparatuses 1 and 2. Next, the controlling unit 16 outputs predetermined signals to the servo circuit 13, laser power controlling circuit 20 and the encoder 17 in order to execute the OPC at two velocities, and a test recording of test recording data is executed to a PCA (s5). Moreover, the OPC is executed at 16× speed that is a minimum recording velocity in zone 1 and 48× velocity that is a maximum recording velocity in zone 4.

Next, the controlling unit 16 reproduces the test-recorded region. The returning light is received by the receiving device of the optical pick up 10 and converted to an electrical signal. The RF amplifier 12 outputs the amplified signal to a signal quality detecting circuit 24 (s6). The controlling unit 16 sets an optimum laser power based on the signal and the like output from the signal quality detecting circuit 24. That is, a slope $a_0$ and y-intercept $b_0$ of $Y=a_0X+b_0$, that is, the full recording power function of all over the zones 1 to 4 are obtained. Also, the recording power function of zone 1 (n zone: an initial value n=1) is corrected based on the optimum laser power and the recording velocity obtained at the minimum recording velocity corresponding to those in zone 1. That is, a slope $1.2a_0$ and y-intercept $b_1$ of the recording power function of zone 1 $Y=1.2a_0X+b_1$ is obtained. Then, the controlling unit 16 outputs data to be recorded in the optical disc for recording output from a host apparatus (not shown in the figure) (s7). This data is irradiated as a laser light from the optical pick up 10 via an encoder 17, a strategy circuit 18 and a laser driver 19, and data is recorded in zone 1 of the optical disc (s8). At this time, a laser power controlling circuit 20 controls the laser driver 19 so that a light beam of the laser power in accordance with the recording power function of zone 1, $Y=1.2a_0X+b_1$, is irradiated from the optical pick up.

The controlling unit 16 judges whether there are data to record in a next zone (n+1 zone) or not when data-recording advances in zone 1 and approaches at an edge of zone 1 (s9). Then, same processes are repeated in zones 2 to 4 (s7 to s10). Then, when data is recorded at an edge of zone 4, and when data recording is completed, the optical disc recording apparatus 1 makes a displaying unit 28 display that data-recording has completed to finish recording process (s11).

In the optical disc recording apparatus 3 according to the third embodiment, instead of the method to record data with an optimum recording quality by obtaining an optimum recording power of a light beam corresponding to a recording velocity based on a recording power function, a method to record data with an optimum recording quality by obtaining a recording power controlling waveform (write strategy) can be executed as same as the optical disc recording apparatus 1 according to the first embodiment.

That is, an optical disc recording apparatus 3 according to the embodiment 3–1 allocates zones with a predetermined width in a recording area when data is recorded with a CAV method as same as an optical disc recording apparatus 3 according to the embodiment 3–1. Also, an OPC is executed with a recording velocity corresponding to each zone by an experiment in advance, and an optimum recording power is obtained to obtain a recording parameter function s. Also, a slope of the recording parameter function (hereinafter called a full recording parameter function) is obtained based on a minimum recording velocity and a maximum recording velocity of recording velocities to be executed in all zones (an all recording area). These are executed by type of the optical discs, and they are stored in a storage unit 25 in the optical disc recording apparatus 3. The experiment for obtaining the recording power function s may be executed in a test area or in a data recording area.

Each coefficient is set for obtaining a recording power function of each zone based on the full recording parameter function in the above. Further, as each coefficient, coefficient to a slope of the full recording power function or a tangent may be obtained by each zone. Also, coefficient for zone 1 may be obtained as a coefficient to a slope of the full recording power function, and coefficient for other zones may be obtained as a coefficient to a slope of other adjacent prior zone (an inner track side zone).

Moreover, when data is recorded, test recording is executed in a test area in the optical disc at two recording velocities of a minimum recording velocity and a maximum recording velocity corresponding to those in full of the plurality of the zones before an actual data-recording to obtain an optimum value of a parameter. Then, a slope in the full recording parameter function is obtained based on the obtained optimum parameter value and recording velocity, and the recording parameter function in each zone is corrected based on the coefficient of the recording parameter function in each zone to the slope of this full recording parameter function. Moreover, this correction may be executed in advance or during recording data based on the recording power at the edge of the zone. Then, when data (an actual data) is recorded, recording is executed by irradiating a light beam of write strategy that adapts an ideal value of the parameter obtained by the corrected recording parameter function in each zone.

However, by executing these methods, in the conventional recording method with the CAV method, as the maximum recording velocity becomes faster, an error of the recording power becomes larger in an intermediate area of the recording area, this defect can be improved by executing these methods, and data can be recorded with an optimum recording power at each recording velocity.

Here, the recording parameter function to be obtained by executing the experiment in advance may preferably be set to be a linear function. Further, in the optical disc apparatus 3, a changing rate in the recording power function set to each zone is preferably descending toward the outer track side zone of an optical disc. The reason is omitted because it is same as the embodiment 3–1.

Here, an abstract explanation for an operation in an embodiment 3–2 of the optical disc recording apparatus 3 according to the third embodiment of the present invention is omitted because the operation is same as the embodiments 1–2 and 2–2.

The present invention has been described in connection with the preferred embodiments. The invention is not limited only to the above embodiments. It is apparent that various modifications, improvements, combinations, and the like can be made by those skilled in the art.

What are claimed are:

1. An optical disc recording method wherein an optical disk is rotated at constant angular velocity (CAV) and data is recorded to a recording area of the optical disc by continuously increasing, from an inner track side to an outer track side of the optical disc, a recording velocity for recording data and, simultaneously, continuously strengthening a recording power of a light beam irradiated to the optical disc for recording the data, the method comprising the steps of:
  (a) allocating a plurality of CAV zones to the recording area of the optical disc and assigning a recording power function in the form of a linear function to each CAV zone which recording power function represents a relationship between the recording velocity and an optimal value of the recording power of the light beam, and setting a coefficient that represents a relationship between slopes of the recording power functions;
  (b) obtaining an optimal recording power by executing a test recording to a test area of the optical disc at two recording velocities which are corresponding recording velocities in a predetermined zone before actual recording of data to the optical disc;
  (c) obtaining the slope of the recording power function of the predetermined zone in accordance with the obtained optimal recording power and correcting the slopes of other zones in accordance with the corrected recording power function of the predetermined zone and the coefficient;
  (d) deriving a recording power corresponding to a recording velocity using the corrected recording power function and the corresponding recording velocity; and
  (e) recording the data by irradiating a light beam of the obtained recording power.

2. An optical disc recording method wherein an optical disk is rotated at constant angular velocity (CAV) and data is recorded to a recording area of an optical disc by continuously increasing, from an inner track side to an outer track side of the optical disc, a recording velocity for recording data and, simultaneously, continuously strengthening a recording power of a light beam irradiated to the optical disc for recording the data, the method comprising the steps of:

(a) allocating a plurality of CAV zones to the recording area of the optical disc and assigning a recording power function in the form of a linear function to each CAV zone which recording power function represents a relationship between the recording velocity and an optimal value of the recording power of the light beam, setting a full recording power function in the form of the linear function, which full recording power function represents a relationship between a recording velocity and an optimal value of the recording power based on two recording velocities that are a minimum and a maximum recording velocities over the recording area and two optimal recording powers respectively at the two recording velocities, and setting a coefficient representing a relationship between a slope of the full recording power function and a slope of the recording power function of each zone;

(b) obtaining an optimal recording power by executing a test recording to a test area of the optical disc at the two recording velocities that are the minimum and the maximum recording velocities before actual recording of data to the optical disc;

(c) obtaining the slope of the full recording power function in accordance with the obtained optimal recording power and correcting the slopes of the recording power function of each zone in accordance with the slope of the full recording power function and the coefficient;

(d) deriving a recording power corresponding to a recording velocity using the corrected recording power function and the corresponding recording velocity; and (e) recording the data by irradiating a light beam of the obtained recording power.

3. An optical disc recording method wherein an optical disk is rotated at constant angular velocity (CAV) and data is recorded to a recording area of an optical disc by continuously increasing, from an inner track side to an outer track side of the optical disc, a recording velocity for recording data and, simultaneously, continuously strengthening a recording power of a light beam irradiated to the optical disc for recording the data, the method comprising the steps of:

(a) allocating a plurality of CAV zones to the recording area of the optical disc and assigning a recording parameter function in the form of the linear function to each CAV zone, which recording power function represents a relationship between the recording velocity and a parameter for a recording power controlling waveform of a light beam, and setting a coefficient representing a relationship between slopes of the recording parameter function of each zone;

(b) obtaining an optimal value of the parameter by executing a test recording to a test area of the optical disc at two recording velocities which are corresponding recording velocities in a predetermined zone before actual recording of data to the optical disc;

(c) obtaining the slope of the recording parameter function of the predetermined zone in accordance with the obtained optimal recording power and correcting the slopes of the recording parameter functions of other zones in accordance with the slope of the recording parameter function of the predetermined zone and the coefficient;

(d) deriving a parameter corresponding to a recording velocity using the corrected recording parameter function and the corresponding recording velocity; and (e) recording the data by irradiating a light beam of the recording power controlling waveform to which the obtained parameter is applied.

4. An optical disc recording method wherein an optical disk is rotated at constant angular velocity (CAV) and data is recorded to a recording area of an optical disc by continuously increasing, from an inner track side to an outer track side of the optical disc, a recording velocity for recording data and, simultaneously, continuously strengthening a recording power of a light beam irradiated to the optical disc for recording the data, the method comprising the steps of:

(a) allocating a plurality of CAV zones to the recording area of the optical disc and assigning a recording parameter function in the form of a linear function to each CAV zone, which recording power function represents a relationship between the recording velocity and a parameter for a recording power controlling waveform of a light beam, setting a full recording parameter function in the form of the linear function, which full recording parameter function represents a relationship between two recording velocities that are a minimum and a maximum recording velocities over the recording area and an optimal value of the parameter for the recording power controlling waveform of a light beam, and setting a coefficient representing a relationship between a slope of the full recording parameter function and a slope of the recording parameter function of each zone;

(b) obtaining an optimal value of the parameter by executing a test recording to a test area of the optical disc at the two recording velocities that are the minimum and the maximum recording velocities before actual recording of data to the optical disc;

(c) obtaining the slope of the full recording parameter function in accordance with the obtained optimal recording power and correcting the slopes of the recording parameter function of each zone in accordance with the, slope of the full recording parameter function and the coefficient;

(d) deriving a parameter corresponding to a recording velocity using the corrected recording parameter function and the corresponding recording velocity; and (e) recording the data by irradiating a light beam of the recording power controlling waveform to which the obtained parameter.

5. An optical disc recording apparatus wherein an optical disk is rotated at constant angular velocity (CAV) and data is recorded to a recording area of an optical disc by continuously increasing, from an inner track side to an outer track side of the optical disc, a recording velocity for recording data and, simultaneously, continuously strengthening a recording power of a light beam irradiated to the optical disc for recording the data, the apparatus comprising:

an allocating device that allocates a plurality of CAV zones to the recording area of the optical disc and assigns a recording power function in the form of a linear function to each CAV zone , which recording power function represents a relationship between the recording velocity and an optimal value of the recording power of the light beam, and sets a coefficient representing a relationship between slopes of the recording power functions;

an optimal recording power obtaining device that obtains an optimal recording power by executing a test recording to a test area of the optical disc at two recording velocities which are corresponding recording velocities in a predetermined zone before actual recording of data to the optical disc;

a correcting device that obtains the slope of the recording power function of the predetermined zone in accordance with the obtained optimal recording power and corrects the slopes of other zones in accordance with the corrected recording power function of the predetermined zone and the coefficient;

a recording power deriving device that derives a recording power corresponding to a recording velocity using the corrected recording power function and the corresponding recording velocity; and a recording device that records the data by irradiating a light beam of the obtained recording power.

6. An optical disc recording apparatus wherein an optical disk is rotated at constant angular velocity (CAV) and data is recorded to a recording area of an optical disc by continuously increasing, from an inner track side to an outer track side of the optical disc, a recording velocity for recording data and, simultaneously, continuously strengthening a recording power of a light beam irradiated to the optical disc for recording the data, the apparatus comprising:

an allocating device that allocates a plurality of CAV zones to the recording area of the optical disc and assigns a recording power function in the form of a linear function to each CAV zone, which recording power function represents a relationship between the recording velocity and an optimal value of the recording power of the light beam, sets a full recording power function in the form of the linear function, which full recording power function represents a relationship between a recording velocity and an optimal value of the recording power based on two recording velocities that are a minimum and a maximum recording velocities over the recording area and two optimal recording powers respectively at the two recording velocities, and sets a coefficient representing a relationship between a slope of the full recording power function and a slope of the recording power function of each zone;

an optimal recording power obtaining device that obtains an optimal recording power by executing a test recording to a test area of the optical disc at the two recording velocities that are the minimum and the maximum recording velocities before actual recording of data to the optical disc;

a correcting device that obtains the slope of the full recording power function in accordance with the obtained optimal recording power and corrects the slopes of the recording power function of each zone in accordance with the slope of the full recording power function and the coefficient;

a recording power deriving device that derives a recording power corresponding to a recording velocity using the corrected recording power function and the corresponding recording velocity; and a recording device that records the data by irradiating a light beam of the obtained recording power.

7. An optical disc recording apparatus wherein an optical disk is rotated at constant angular velocity CAV and data is recorded to a recording area of an optical disc by continuously increasing, from an inner track side to an outer track side of the optical disc, a recording velocity for recording data and, simultaneously, continuously strengthening a recording power of a light beam irradiated to the optical disc for recording the data, the apparatus comprising:

an allocating device that allocates a plurality of CAV zones to the recording area of the optical disc, assigns a recording parameter function in the form of a linear function to each CAV zone, which recording parameter function represents a relationship between the recording velocity and a parameter for a recording power controlling waveform of a light beam and sets a coefficient representing a relationship between slopes of the recording parameter function of each zone;

an optimal recording power obtaining device that obtains an optimal value of the parameter by executing a test recording to a test area of the optical disc at two recording velocities which are corresponding recording velocities in a predetermined zone before actual recording of data to the optical disc;

a correcting device that obtains the slope of the recording parameter function of the predetermined zone in accordance with the obtained optimal recording power and corrects the slopes of the recording parameters of other zones in accordance with the slope of the recording parameter function of the predetermined zone and the coefficient;

a recording power deriving device that derives a parameter corresponding to a recording velocity using the corrected recording parameter function and the corresponding recording velocity; and a recording device that records the data by irradiating a light beam of the recording power controlling waveform to which the obtained parameter.

8. An optical disc recording apparatus wherein an optical disk is rotated at constant angular velocity CAV and data is recorded to a recording area of an optical disc by continuously increasing, from an inner track side to an outer track side of the optical disc, a recording velocity for recording data and, simultaneously, continuously strengthening a recording power of a light beam irradiated to the optical disc for recording the data, the apparatus comprising:

an allocating device that allocates a plurality of zones to the recording area of the optical disc and assigns a recording parameter function in the form of a linear function to each CAV zone, which recording parameter function represents a relationship between the recording velocity and a parameter for a recording power controlling waveform of a light beam, sets a full recording parameter function in the form of the linear function, which full recording power function represents a relationship between two recording velocities that are a minimum and a maximum recording velocities over the recording area and an optimal value of the parameter for the recording power controlling waveform of a light beam and sets a coefficient representing a relationship between a slope of the full recording parameter function and a slope of the recording parameter function of each zone;

an optimal recording power obtaining device that obtains an optimal value of the parameter by executing a test recording to a test area of the optical disc at the two recording velocities that are the minimum and the maximum recording velocities before actual recording of data to the optical disc;

a correcting device that obtains the slope of the full recording parameter function in accordance with the obtained optimal recording power and corrects the slopes of the recording parameter function of each zone in accordance with the slope of the full recording parameter function and the coefficient;

a recording power deriving device that derives a parameter corresponding to a recording velocity using the corrected recording parameter function and the corresponding recording velocity; and a recording device that records the data by irradiating a light beam of the recording power controlling waveform to which the obtained parameter.

* * * * *